US012146582B2

(12) United States Patent
McFetridge et al.

(10) Patent No.: US 12,146,582 B2
(45) Date of Patent: Nov. 19, 2024

(54) AUTOMATED BI-STABLE VALVE SYSTEM AND METHOD OF USING THE SAME FOR COMPOSITE MANUFACTURING

(71) Applicant: The Boeing Company, Chicago, IL (US)

(72) Inventors: Shaun A. McFetridge, Melbourne (AU); David M. Bain, Melbourne (AU); Benjamin S. Zielinski, Melbourne (AU); Conrad Sevenster, Melbourne (AU)

(73) Assignee: The Boeing Company, Arlington, VA (US)

( * ) Notice: Subject to any disclaimer, the term of this patent is extended or adjusted under 35 U.S.C. 154(b) by 375 days.

(21) Appl. No.: 17/495,722

(22) Filed: Oct. 6, 2021

(65) Prior Publication Data
US 2023/0272867 A1    Aug. 31, 2023

(51) Int. Cl.
*F16K 31/06*         (2006.01)
*B25J 15/00*         (2006.01)
(Continued)

(52) U.S. Cl.
CPC ......... *F16K 31/082* (2013.01); *B25J 15/0061* (2013.01); *B25J 15/0625* (2013.01);
(Continued)

(58) Field of Classification Search
None
See application file for complete search history.

(56) References Cited

U.S. PATENT DOCUMENTS 3,212,751 A * 10/1965 Hassa ................... F16K 31/086
                                                        251/65
4,792,113 A * 12/1988 Eidsmore ............. G05D 7/0126
                                                        137/460
(Continued)

FOREIGN PATENT DOCUMENTS

DE    202009014154 U1    1/2010
DE    202014100337 U1    5/2015
(Continued)

OTHER PUBLICATIONS

Extended European Search Report (EESR), European Patent Office, Mar. 2, 2023, for Application No. EP22187791.3, Applicant The Boeing Company, 8 pages.

*Primary Examiner* — Matthew W Jellett

(57) ABSTRACT

There is provided an automated bi-stable valve system. The system includes a bi-stable valve mechanism with bi-stable valves. Each of the bi-stable valves is configured to switch between a valve closed state and a valve open state. The system includes a control system coupled to the bi-stable valve mechanism and configured to operably control the bi-stable valve mechanism. The control system includes, (i) at least one traversable bridge apparatus, and (ii) a valve switch mechanism attached to the traversable bridge apparatus, and movable, via the traversable bridge apparatus, over the bi-stable valves. The valve switch mechanism is configured to switch the bi-stable valve(s) between the valve closed state and the valve open state, to allow for selective control of one or more adhesion zones on the bi-stable valve mechanism. The adhesion zone(s) correspond to adhesion area(s) on a surface of a material to be selectively picked up and placed.

27 Claims, 21 Drawing Sheets

(51) Int. Cl.
  *B25J 15/06* (2006.01)
  *B26D 7/18* (2006.01)
  *F16K 31/08* (2006.01)

(52) U.S. Cl.
  CPC ........ *B26D 7/1863* (2013.01); *F16K 31/0655* (2013.01); *F16K 31/0675* (2013.01); *F16K 31/086* (2013.01)

(56) References Cited

U.S. PATENT DOCUMENTS

| | | | | |
|---|---|---|---|---|
| 5,161,578 | A | * | 11/1992 | Dreibelbis ............... F24F 11/76 251/65 |
| 5,169,117 | A | * | 12/1992 | Huang .................. F16K 31/086 251/38 |
| 6,055,895 | A | * | 5/2000 | Kanazawa ............. B21D 43/20 83/167 |
| 8,960,745 | B2 | * | 2/2015 | Regan .................. B25J 15/0625 294/185 |
| 9,522,474 | B2 | * | 12/2016 | Gallucci .................. B26D 7/32 |
| 9,656,771 | B2 | * | 5/2017 | Thompson ................ B65B 5/08 |
| 10,150,219 | B2 | * | 12/2018 | Ridel .................... B25J 11/0045 |
| 11,059,186 | B2 | * | 7/2021 | Schneider ............ B25J 15/0052 |

FOREIGN PATENT DOCUMENTS

| | | |
|---|---|---|
| EP | 3912771 A1 | 11/2021 |
| WO | 2012017336 A1 | 2/2012 |

* cited by examiner

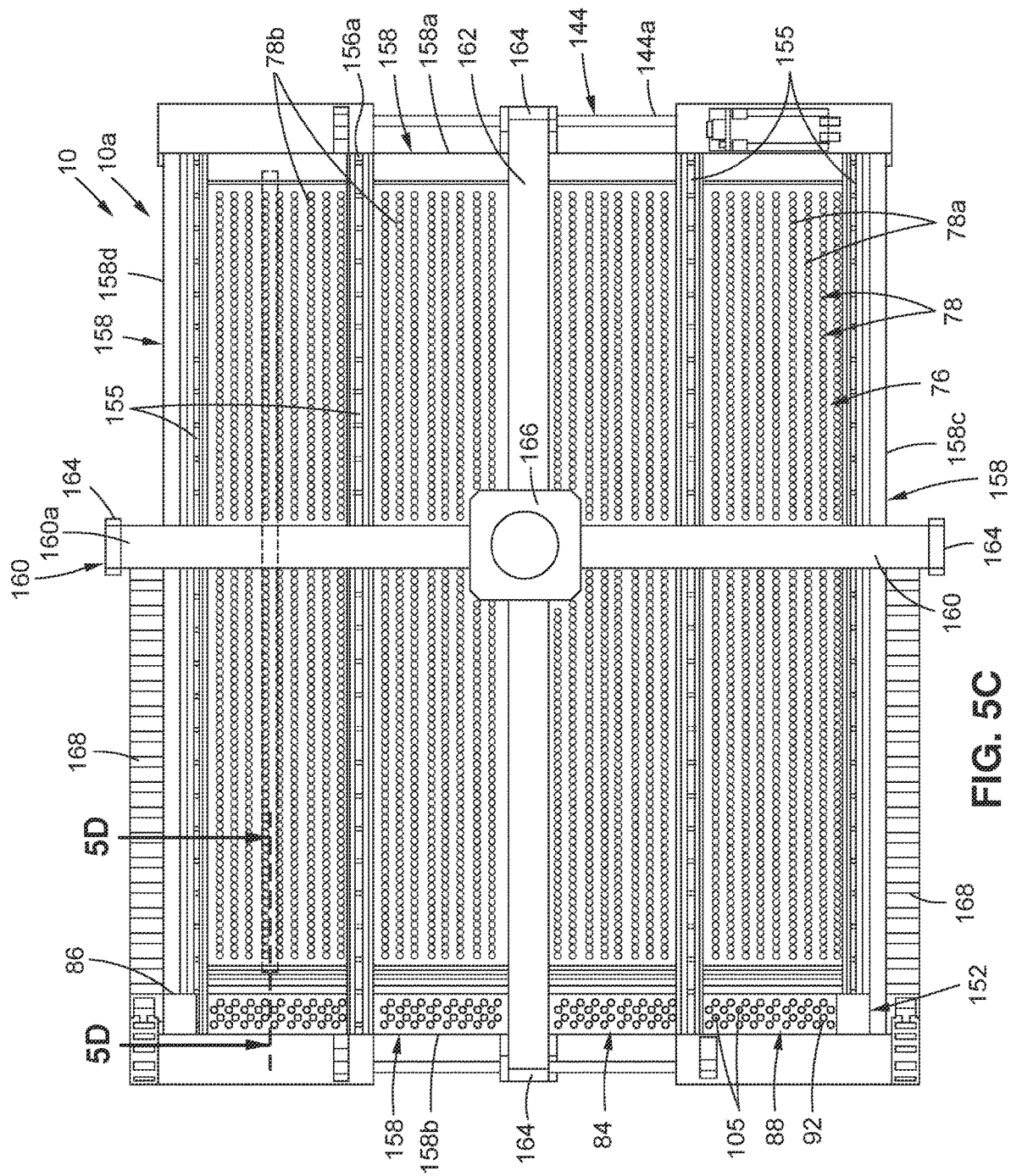

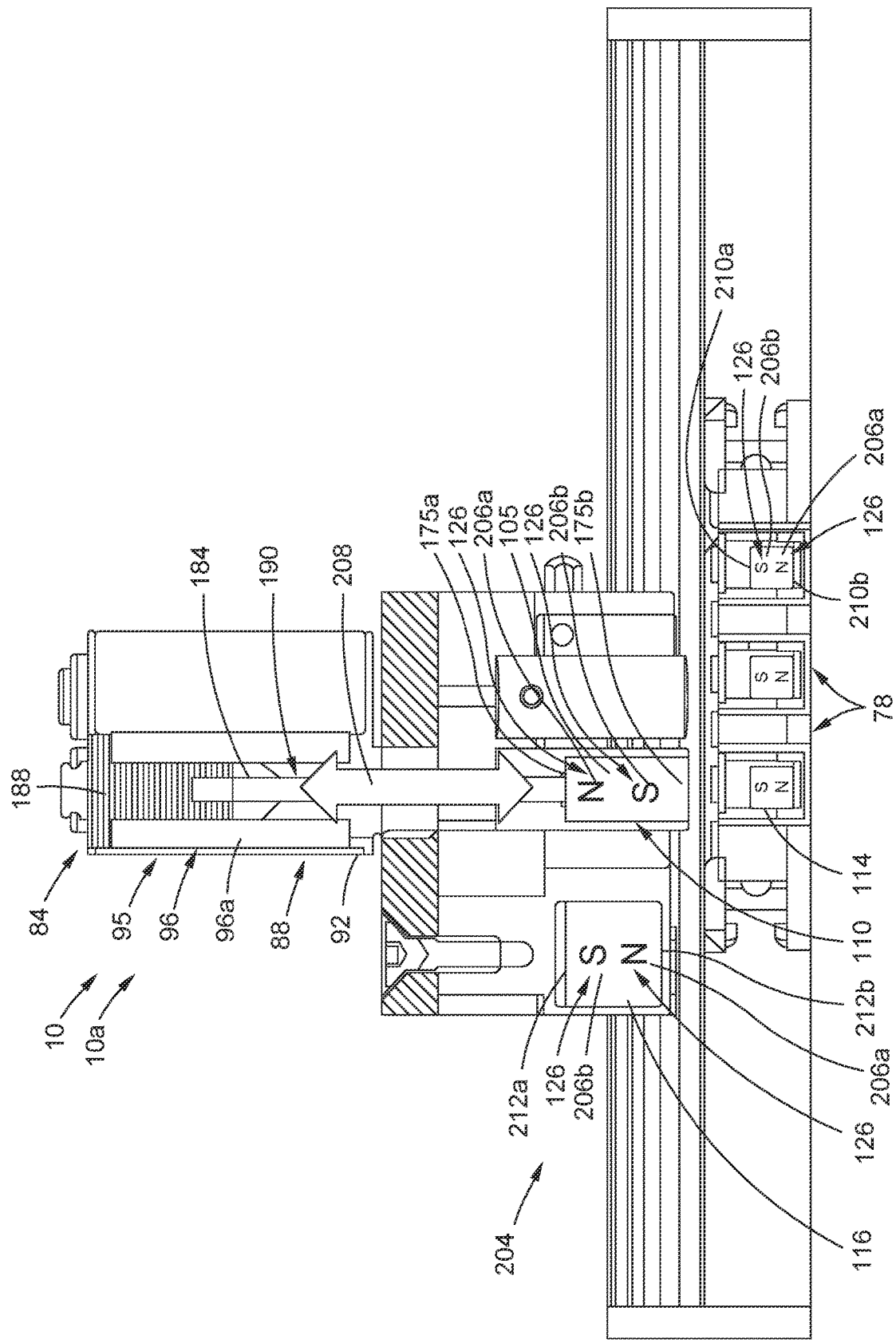

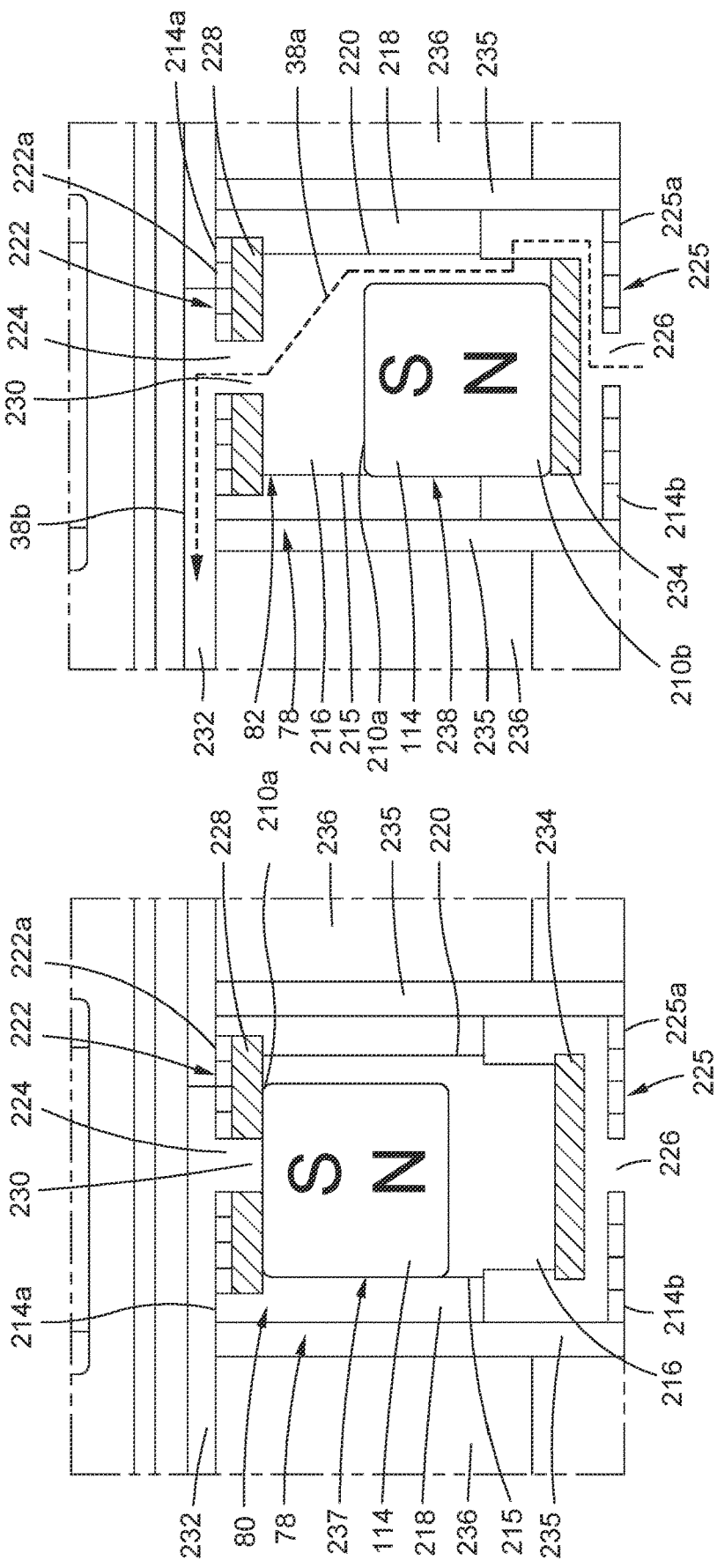

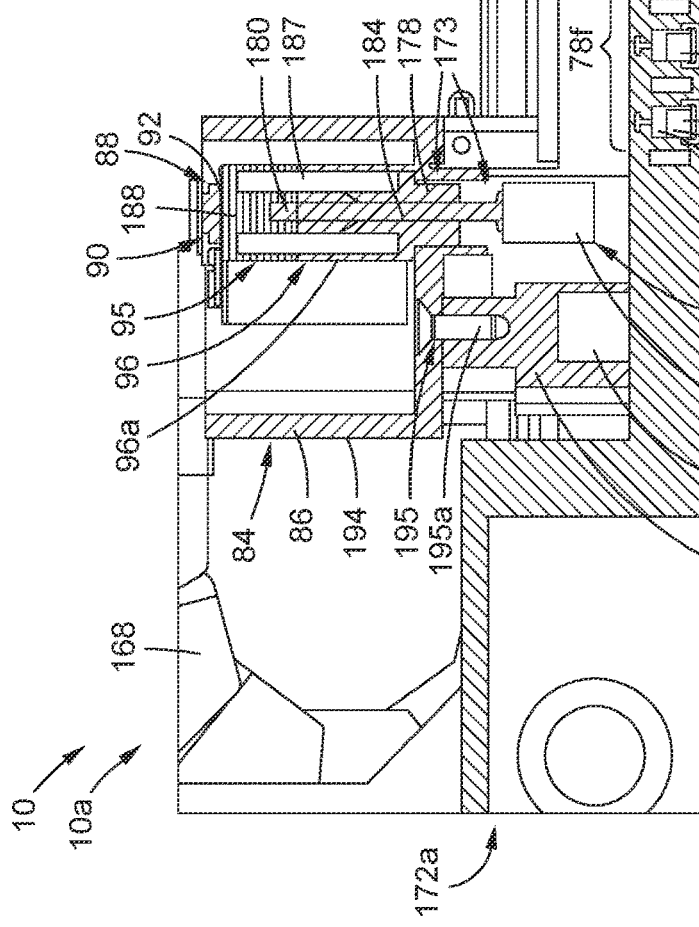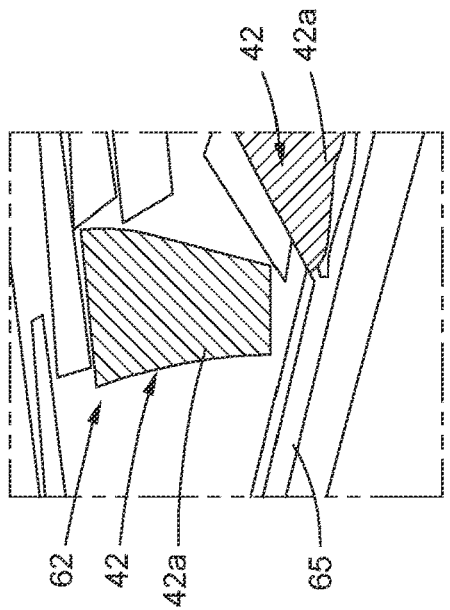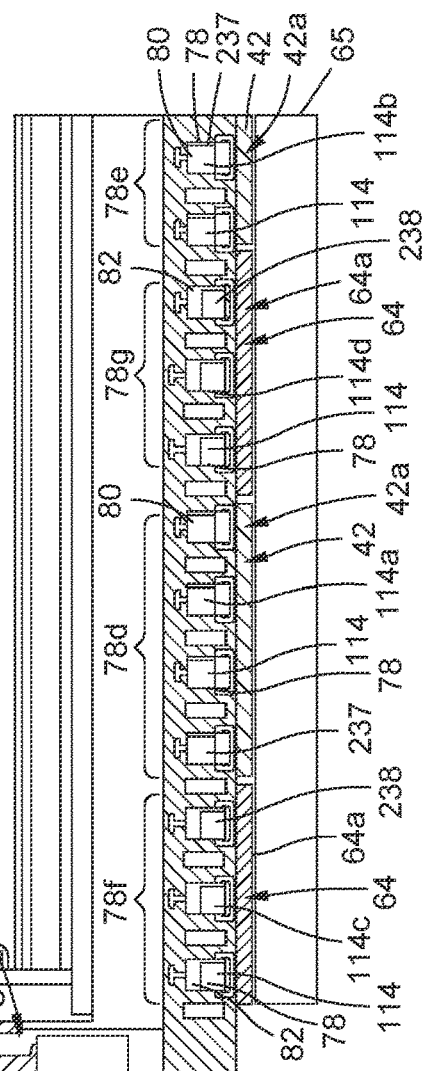

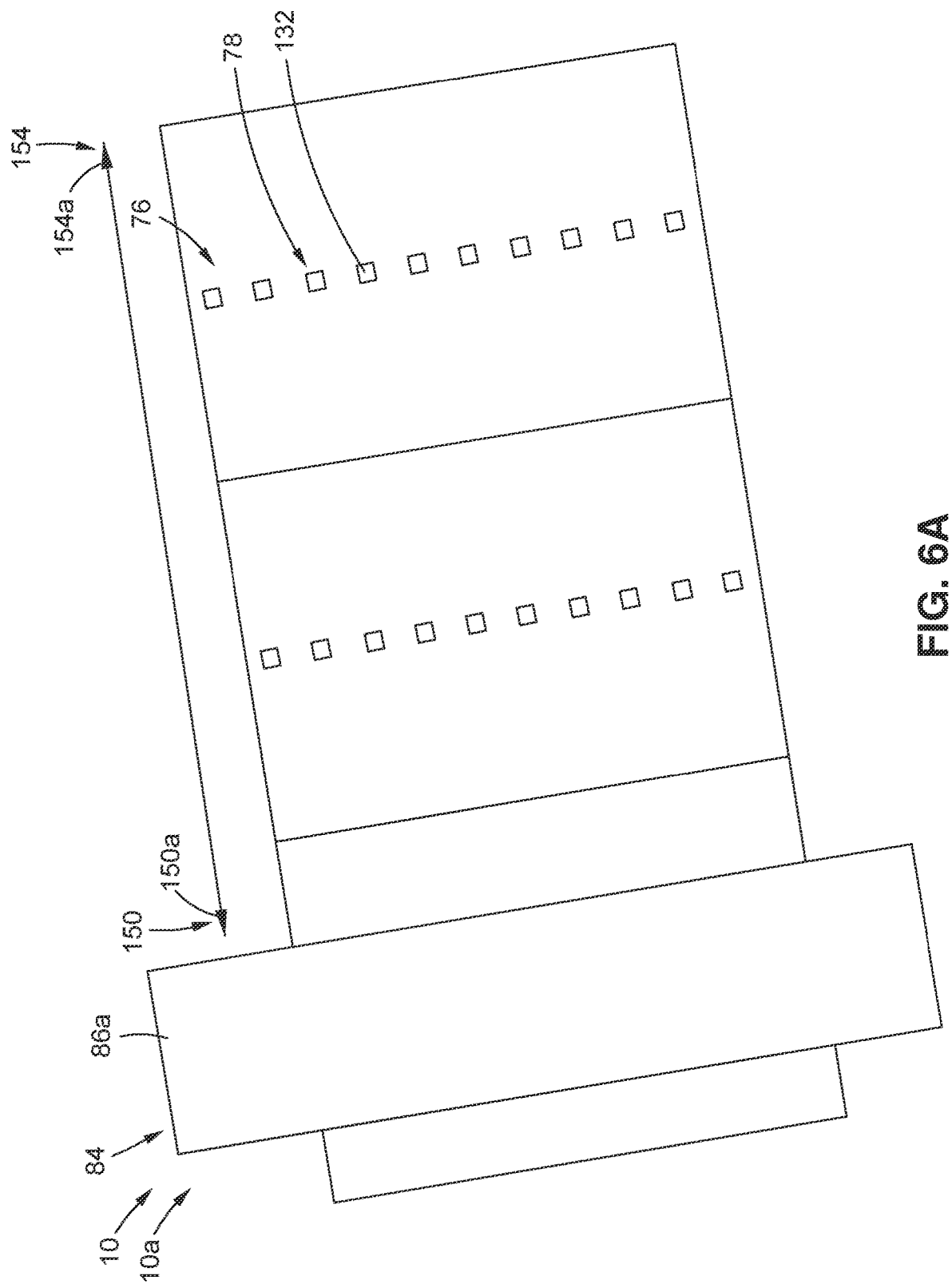

AUTOMATED BI-STABLE VALVE SYSTEM AND METHOD OF USING THE SAME FOR COMPOSITE MANUFACTURING

FIELD

The disclosure relates generally to the manufacture of composite structures, such as those used in the aircraft industry, and relates more particularly, to a system and method for handling of plies during composite manufacturing using an automated bi-stable valve system having multiple valves controlled by one control mechanism.

BACKGROUND

Composite structures may be used in a wide variety of applications, including in the manufacture of aircraft, due to their high strength-to-weight ratios, corrosion resistance and other favorable properties. In particular, in aircraft manufacturing, composite structures may be used to form the fuselage, wings, tail sections, and other parts of the aircraft.

Such composite structures may be formed from composite laminates comprising multiple stacked composite plies, or layers, laminated together. Prior to forming the composite laminates, the composite plies may be cut from rolls or sheets of dry, raw fiber material, for example, unidirectional fiber material, creating a ply nest, and then picked up and typically separated from adjacent waste material. Handling of cut composite plies made of unidirectional fiber material may be difficult due to lack of stiffness in a non-fiber direction. Further, when picking up such cut composite plies from within the ply nest, for example, with a robot, it is desirable for ply adhesion not to extend past the ply edges, so as to leave waste material behind and prevent disturbance of other cut composite plies in the ply nest. Additionally, such cut composite plies may present in any rotation or geometry. Thus, control of ply adhesion, including a very fine control over where adhesion is applied to a surface of a cut composite ply is desirable.

Pneumatic valves are typically used in industrial applications where the on/off flow of air, such as compressed air, is controlled. However, because such pneumatic valves are optimized for compressed air, they may not be suitable for pulling vacuum. Moreover, such pneumatic valves are typically individually controlled. Where multiple valves, such as multiple pneumatic valves, are used, valve blocks may be needed to consolidate electronic controls and the plumbing of the air supply. However, such valve blocks, as well as such pneumatic valves, may be bulky in size and heavy in weight, and it may be difficult to arrange them sufficiently close together to achieve a high density of adhesion zones to pick up less stiff materials.

In addition, the textile industry has a known method for automated material handling of flexible materials that includes adding temporary stiffening agents into the material during the manufacturing process. However, such known method is undesirable for aerospace applications, and in particular, it is undesirable to add temporary stiffening agents to primary aircraft structures, such as fuselage, wings, and tail sections.

Further, passive check valves are used in some area vacuum grippers that rely on air flow, where the object is not to restrict the air flow, to close the valve. However, such area vacuum grippers with passive check valves do not have discrete control of adhesion zones to pick up less stiff materials, and the entire pick surface of such area vacuum grippers is either active or inactive. Thus, such area vacuum grippers may not be suitable to selectively pick up multiple cut composite plies from across a ply nest.

Accordingly, there is a need for an automated bi-stable valve system and method for handling and selectively removing plies, such as cut composite plies, in composite manufacturing that control ply adhesion and provide a very fine control over where adhesion is applied to a surface of a cut composite ply, that allow multiple valves to be controlled by one control mechanism, that allow for multiple valves to be arranged closely together to enable significantly higher valve densities, and that allow multiple valves that are significantly less size, mass, and weight, as compared to known pneumatic valve systems and valve blocks, and that provide additional advantages over known systems and methods.

SUMMARY

Example implementations of the disclosure provide an automated bi-stable valve system and method for a material handling process in composite manufacturing. As discussed in the below detailed description, versions of the system and method may provide significant advantages over known systems and methods.

In a version of the disclosure, there is provided an automated bi-stable valve system. The automated bi-stable valve system comprises a bi-stable valve mechanism comprising a plurality of bi-stable valves. Each of the plurality of bi-stable valves is configured to switch between a valve closed state and a valve open state.

The automated bi-stable valve system further comprises a control system coupled to the bi-stable valve mechanism and configured to operably control the bi-stable valve mechanism. The control system comprises: (i) at least one traversable bridge apparatus; and (ii) a valve switch mechanism attached to the at least one traversable bridge apparatus, and movable, via the at least one traversable bridge apparatus, over the plurality of bi-stable valves.

The valve switch mechanism is configured to switch one or more of the plurality of bi-stable valves between the valve closed state and the valve open state, to allow for selective control of one or more adhesion zones on the bi-stable valve mechanism. The one or more adhesion zones correspond to one or more adhesion areas on a surface of a material to be selectively picked up and placed during a material handling process.

In another version of the disclosure, there is provided an automated material handling system for a material handling process in composite manufacturing. The automated material handling system comprises one or more cut plies to be selectively picked up and removed from a work surface. The automated material handling system further comprises a robot having an arm with an end effector.

The automated material handling system further comprises a vacuum system coupled to the end effector. The automated material handling system further comprises an automated bi-stable valve system coupled to a first end of the end effector. The automated bi-stable valve system comprises: (a) a bi-stable valve mechanism comprising a plurality of bi-stable valves, wherein each of the plurality of bi-stable valves is configured to switch between a valve closed state and a valve open state; and (b) a control system coupled to the bi-stable valve mechanism and configured to operably control the bi-stable valve mechanism.

The control system comprises: (i) at least one traversable bridge apparatus; and (ii) a valve switch mechanism attached to the at least one traversable bridge apparatus, and movable, via the at least one traversable bridge apparatus, over the plurality of bi-stable valves. The valve switch mechanism is configured to switch one or more of the plurality of bi-stable valves between the valve closed state and the valve open state, to allow for selective control of one or more adhesion zones on the bi-stable valve mechanism. The one or more adhesion zones correspond to one or more adhesion areas on a surface of the one or more cut plies to be selectively picked up and removed from the work surface during the material handling process in the composite manufacturing.

In another version of the disclosure, there is provided a method of using an automated bi-stable valve system in a material handling process for composite manufacturing. The method comprises the step of providing an automated bi-stable valve system.

The automated bi-stable valve system comprises: (a) a bi-stable valve mechanism comprising a plurality of bi-stable valves, wherein each of the plurality of bi-stable valves is configured to switch between a valve closed state and a valve open state; and (b) a control system coupled to the bi-stable valve mechanism and configured to operably control the bi-stable valve mechanism. The control system comprises: (i) at least one traversable bridge apparatus; and (ii) a valve switch mechanism attached to the at least one traversable bridge apparatus, and movable, via the at least one traversable bridge apparatus, over the plurality of bi-stable valves.

The method further comprises the step of coupling the automated bi-stable valve system to an end effector attached to a robot and attached to a vacuum system. The method further comprises the step of selectively picking up and removing, with the automated bi-stable valve system, one or more cut plies from a work surface, by selectively switching, with the valve switch mechanism, one or more of the plurality of bi-stable valves from the valve closed state to the valve open state, to allow for selective control of one or more adhesion zones on the bi-stable valve mechanism. The one or more adhesion zones correspond to one or more adhesion areas on a surface of the one or more cut plies, and to increase valve densities.

The features, functions, and advantages that have been discussed can be achieved independently in various versions of the disclosure or may be combined in yet other versions further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale. The drawings are examples and not meant as limitations on the description or claims.

FIG. 5C is an illustration of a top view of the automated bi-stable valve system of FIG. 5B;

FIG. 5F is an illustration of an enlarged sectional side view of a portion of the actuating control magnet assembly of FIG. 5D, showing magnetic poles of a control magnet, a wiping magnet, and floating magnets;

FIG. 5G is an illustration of an enlarged sectional side view of a bi-stable valve with a floating magnet of the actuating control magnet assembly of FIG. 5F, showing the bi-stable valve in a valve closed state;

FIG. 5H is an illustration of an enlarged sectional side view of a bi-stable valve with a floating magnet of the actuating control magnet assembly of FIG. 5F, showing the bi-stable valve in a valve open state;

FIG. 5I is an illustration of an enlarged cross-section view of a portion of the automated bi-stable valve system of FIG. 5D, showing bi-stable valves in a valve closed state and bi-stable valves in a valve open state;

FIG. 5J is an illustration of a top perspective view of plies to be picked up from a ply nest;

FIG. 6A is an illustration of a top schematic view of another exemplary version of an automated bi-stable valve system of the disclosure;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
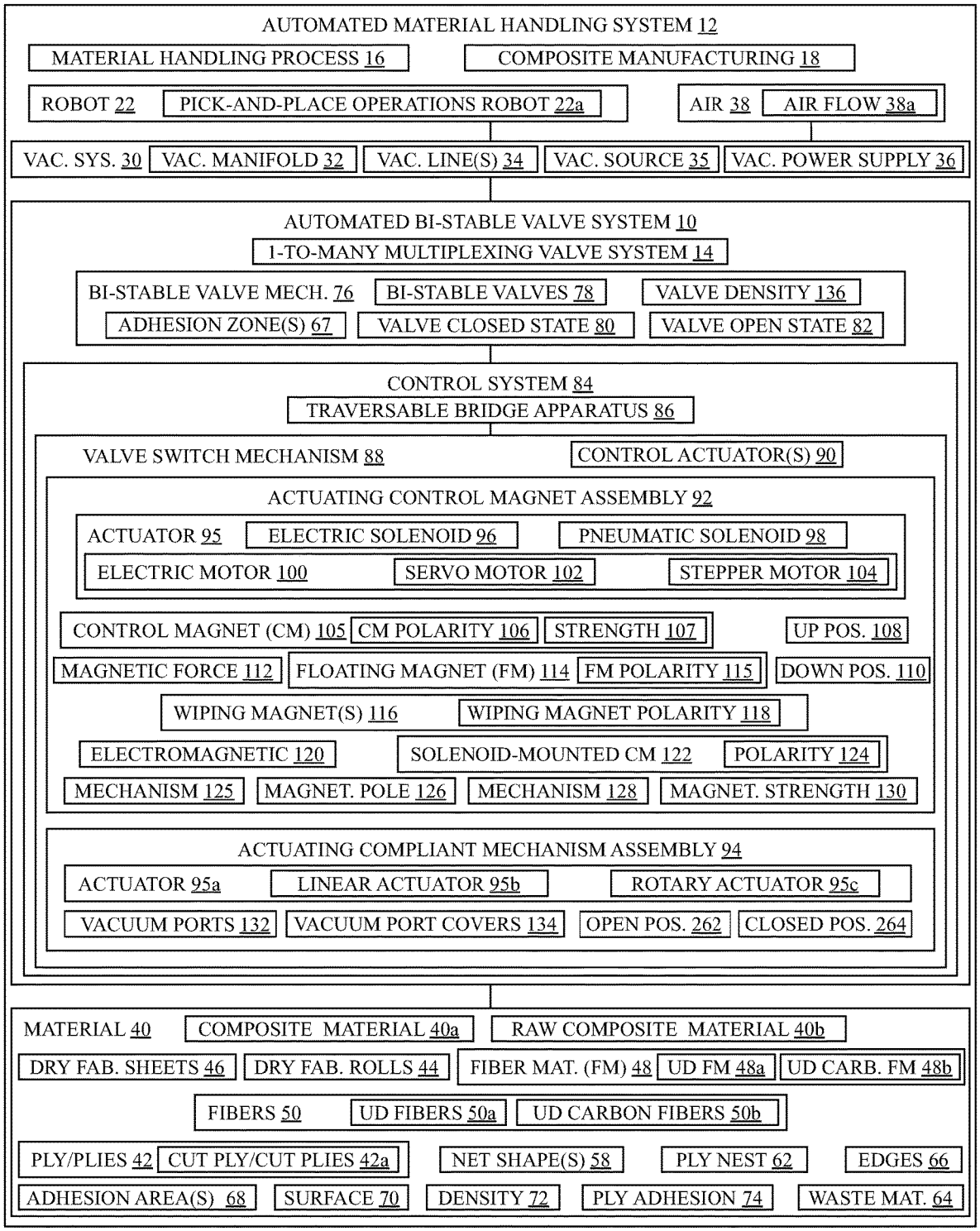
FIG. 1 is an illustration of a functional block diagram showing exemplary versions of an automated bi-stable valve system of the disclosure, used in an exemplary version of an automated material handling system of the disclosure.

Now referring to the Figures, FIG. 1 is an illustration of a functional block diagram showing exemplary versions of an automated bi-stable valve system 10 of the disclosure, used in an exemplary version of an automated material handling system 12 of the disclosure. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the automated bi-stable valve system 10 in FIG. 1A is not meant to imply physical or architectural limitations to the manner in which an illustrative example may be implemented. Other components in addition to or in place of the ones illustrated may be used. Some components may be unnecessary.

In one version of the disclosure, as shown in FIG. 1, there is provided the automated bi-stable valve system 10 that provides a 1-to-many multiplexing valve system 14. In another version of the disclosure, as shown in FIG. 1, there is provided the automated material handling system 12 for a material handling process 16 in composite manufacturing 18 of composite structures 20, where the automated material handling system 12 includes the automated bi-stable valve system 10.

As shown in FIG. 1, in one exemplary version, the automated material handling system 12 comprises a robot 22 (see also FIG. 4A), such as a pick-and-place (PNP) operations (OP) robot 22a. The robot 22 has an arm 24 (see FIG. 4A) with an end effector 26 (see FIGS. 4A-4B). The end effector 26 has a first end 28a (see FIG. 4A) and a second end 28b (see FIG. 4A). The automated bi-stable valve system 10 is coupled to the first end 28a of the end effector 26, and the second end 28b of the end effector 26 is coupled to the arm 24 of the robot 22. The automated bi-stable valve system 10 is held by the robot 22, via the end effector 26.

As shown in FIG. 1, the automated material handling system 12 further comprises a vacuum (VAC) system 30 having a portion coupled to the end effector 26 or another suitable part of the robot 22, and having a portion coupled to the automated bi-stable valve system 10. As shown in FIG. 1, the vacuum system 30 comprises a vacuum manifold 32, one or more vacuum lines 34, a vacuum source 35, and a vacuum power supply 36. The vacuum source 35 may comprise a vacuum generator 35a (see FIG. 4A), a blower, or another suitable vacuum source, configured to pull air 38 in an air flow 38a, or vacuum flow, through the one or more vacuum lines 34, the vacuum manifold 32, and the automated bi-stable valve system 10. The vacuum system 30 may further comprise one or more control valves, shutoff valves, and/or other suitable vacuum system components. The vacuum manifold 32 is coupled to the automated bi-stable valve system 10, via one or more vacuum lines 34, and the vacuum manifold 32 is coupled to the vacuum source 35, via one or more vacuum lines 34.

As shown in FIG. 1, the automated material handling system 12 further comprises a material 40, such as a composite material 40a, for example, raw composite material 40b, in the form of one or more plies 42, or layers, such as one or more cut plies 42a, to be picked up by the robot 22 using the automated bi-stable valve system 10 during the material handling process 16 in the composite manufacturing 18. The robot 22 positions the automated bi-stable valve system 10 over the top of the material 40, such as the composite material 40a, for example, the raw composite material 40b, in the form of one or more plies 42, such as one or more cut plies 42a, prior to pick up and removal.

The material 40, such as the composite material 40a, for example, raw composite material 40b, is supplied in the form of carbon or non-carbon dry fabric rolls 44 (see FIGS. 1, 3), dry fabric sheets 46, or another suitable form, comprised of fiber material (FM) 48, such as unidirectional (UD) fiber material (FM) 48a, for example, unidirectional (UD) carbon fiber material (FM) 48b. As shown in FIG. 1, the fiber material 48 comprises fibers 50, such as unidirectional (UD) fibers 50a, for example, unidirectional (UD) carbon fibers 50b. The fibers 50 may be stitched together with threads 52 (see FIG. 2) to form a stitched unidirectional fabric 54 (see FIG. 2), may have tackifiers to hold the fibers 50 together, or may be held together in another suitable manner. The fibers 50 may be made from natural and/or man-made materials such as carbon, fiberglass, graphite, and the like. The material 40, such as the composite material 40a, for example, the raw composite material 40b, has stiffness in a fiber direction 55 (see FIG. 2) but has a low bending stiffness, or no stiffness, in a non-fiber direction 56 (see FIG. 2), or in any direction relative to the fibers 50. The composite material 40a may further comprise carbon fiber reinforced polymer (CFRP) materials, including plastic or thermoplastic materials, known in the art.

Figure 3:
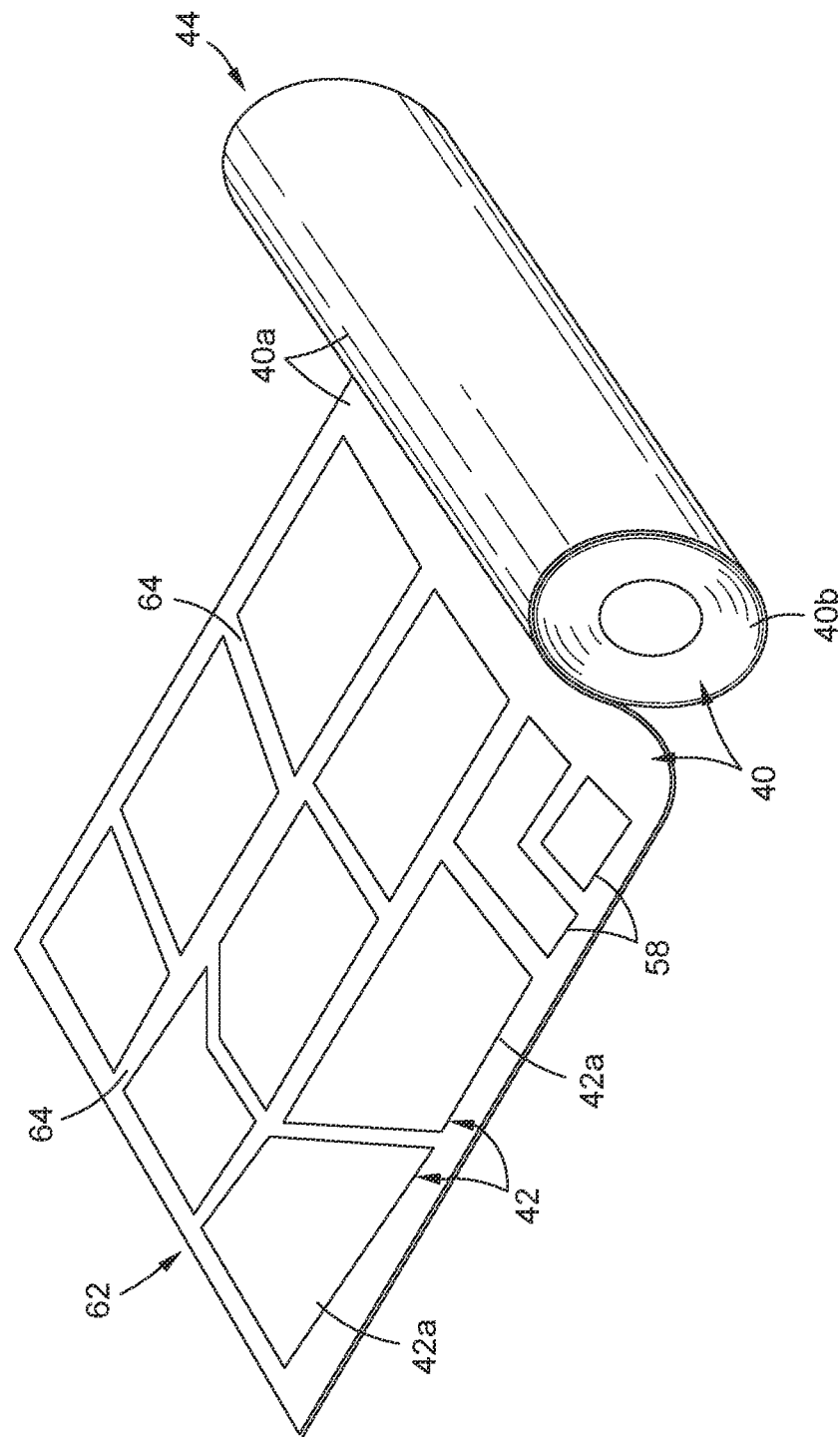
FIG. 3 is an illustration of a side perspective view of an exemplary version of a dry fabric roll of material showing cut plies arranged in a ply nest.

Prior to the plies 42, or layers, of the material 40, such as the composite material 40a, being picked up by the robot 22 using the automated bi-stable valve system 10, the plies 42 are cut from the dry fabric rolls 44, dry fabric sheets 46, or other suitable form, into net shapes 58 (see FIG. 1) with a cutter apparatus 60 (see FIG. 4A), such as an automated cross-cutter apparatus 60a (see FIG. 4A), to form cut plies 42a (see FIGS. 1, 3) arranged in a ply nest 62 (see FIGS. 1, 3). The plies 42, such as the cut plies 42a, in the ply nest 62 are adjacent to non-cut material or non-cut composite material, comprising waste material 64, also referred to as skeleton material, or scrap material. The plies 42, such as the cut plies 42a, in the ply nest 62 are configured to be picked up and placed by the robot 22 using the automated bi-stable valve system 10, and separated from the remaining material, such as the remaining composite material, comprising the waste material 64 (see FIGS. 1, 3) that is not picked up. One or more portions 64a (see FIG. 1) of the waste material 64 may be discarded or recycled for re-use.

One or more plies 42, such as one or more cut plies 42a, in the ply nest 62 can be selectively picked up from a work surface 65 (see FIG. 4A) by the robot 22 using the automated bi-stable valve system 10, and removed or moved from the work surface 65, to a tool or mold for laying up, or to a carrier apparatus, a kitting tray, a mobile apparatus, or another suitable apparatus for transport. The work surface 65 may comprise a cutting table, a mobile table, a carrier apparatus, a conveyor belt, a tool, or another suitably flat surface. The material 40, such as the composite material 40a, in the form of one or more plies 42, such as one or more cut plies 42a, is selectively picked up from the work surface 65 by the robot 22, using the automated bi-stable valve system 10, and the waste material 64, or skeleton material or scrap material, is not picked up and is left on the work surface 65 for removal and discarding or reuse. The automated bi-stable valve system 10 picks up and holds each ply 42, such as each cut ply 42a, to edges 66 (see FIG. 1) of the ply 42, such as the cut ply 42a, and does not go past the edges 66, thus avoiding picking up the waste material 64, or skeleton material or scrap material.

The automated bi-stable valve system 10 allows for selective and discrete control of one or more adhesion zones 67 (see FIGS. 1, 4B) on the bi-stable valve mechanism 76. The one or more adhesion zones 67 correspond to one or more adhesion areas 68 (see FIGS. 1, 4B) on a surface 70 (see FIGS. 1, 4B) of the material 40 (see FIGS. 1, 4B), such as the ply 42 (see FIGS. 1, 4B), for example, the cut ply 42a (see FIGS. 1, 4B), to be picked up and placed during the material handling process 16. to increase a density 72 (see FIG. 1) of the adhesion areas 68 on the surface 70, to enable selective pick up the one or more plies 42, such as one or more cut plies 42a. Thus, the automated bi-stable valve system 10 provides a very fine control over where ply adhesion 74 (see FIG. 1) is applied to the surface 70 (see FIG. 1) of each ply 42, such as each cut ply 42a, from the ply nest 62, without disturbing or picking up the waste material 64.

After the one or more plies 42, such as the one or more cut plies 42a, are picked up by the robot 22 using the automated bi-stable valve system 10, the one or more plies 42, such as the one or more cut plies 42a, may be placed on a tool or mold for layup and forming to form a composite layup. The one or more plies 42, such as the one or more cut plies 42a may get vacuum bagged, infused with resin, and placed into an autoclave or oven to undergo a curing process, to form a composite laminate. The dry fabric rolls 44 or dry fabric sheets 46 may be preimpregnated or infused with a resin material, such as a resin binder, for example, a thermoset material or a thermoplastic material, prior to, or during, the curing process.

The composite laminate is used to form a composite part 294 (see FIG. 8), such as an aircraft composite part 296 (see FIG. 8), for example, a spar, such as a wing spar or another type of spar, a rib, a stiffening member, a stringer, a beam, or another suitable composite part. In one illustrative version, the composite part 294, such as the aircraft composite part 296, is used in the manufacture of a vehicle 280 (see FIG. 8), such as an aircraft 280a (see FIG. 8). The composite part 294 may also be made in the manufacture of vehicles 280, including rotorcraft, spacecraft, watercraft, automobiles, trucks, and other suitable vehicles, or in the manufacture of suitable structures.

As shown in FIG. 1, the automated material handling system 12 comprises the automated bi-stable valve system 10. The automated bi-stable valve system 10 comprises a bi-stable valve mechanism 76 (see FIG. 1) comprising a plurality of bi-stable valves 78 (see FIG. 1). Each of the plurality of bi-stable valves 78 is configured to switch between a valve closed state 80 (see FIG. 1) and a valve open state 82 (see FIG. 1). The bi-stable valves 78 are switched to selectively apply ply adhesion 74 to the surface 70 of each of the plies 42, such as the cut plies 42a. The structure of the bi-stable valves 78 is discussed in further detail below with respect to FIGS. 5G and 5H.

As used herein, "bi-stable valve" means a valve that has two stable states or positions, including the valve closed state 80, to block or deny air flow 38a or vacuum flow, and the valve open state 82, to allow air flow 38a or vacuum flow.

As shown in FIG. 1, the automated bi-stable valve system 10 further comprises a control system 84 coupled to the bi-stable valve mechanism 76 and configured to operably control the bi-stable valve mechanism 76. As shown in FIG. 1, the control system 84 comprises at least one traversable bridge apparatus 86 and a valve switch mechanism 88. The valve switch mechanism 88 is attached to the at least one traversable bridge apparatus 86, and movable, via the at least one traversable bridge apparatus 86, over the plurality of bi-stable valves 78. The valve switch mechanism 88 is configured to switch one or more of the plurality of bi-stable valves 78 between the valve closed state 80 and the valve open state 82, to allow for selective control of one or more adhesion zones 67 (see FIG. 1) on the bi-stable valve mechanism 76. The one or more adhesion zones 67 correspond to one or more adhesion areas 68 (see FIG. 1) on the surface 70 of the material 40, such as the composite material 40a, in the form of one or more plies 42, such as one or more cut plies 42a, to be selectively picked up and placed during the material handling process 16.

As shown in FIG. 1, the valve switch mechanism 88 comprises a plurality of control actuators 90. In one version, the plurality of bi-stable valves 78 comprises a plurality of rows 78a (see FIG. 5C) of bi-stable valves 78, and each control actuator 90 of the plurality of control actuators 90 is configured to actuate one or more different rows 78b (see FIG. 5C) of the plurality of rows 78a of bi-stable valves 78.

In one version, as shown in FIG. 1, the valve switch mechanism 88 comprises at least one actuating control magnet assembly 92 (see also FIGS. 5A-5J). Alternatively, in another version, as shown in FIG. 1, the valve switch mechanism 88 comprises at least one actuating compliant mechanism assembly 94 (see also FIGS. 6A-6F). In the version where the valve switch mechanism 88 comprises the at least one actuating control magnet assembly 92, it does not comprise the at least one actuating compliant mechanism assembly 94. In the version where the valve switch mechanism 88 comprises the at least one actuating compliant mechanism assembly 94, it does not comprise the at least one actuating control magnet assembly 92.

With the actuating control magnet assembly 92, the control actuator 90 comprises an actuator 95 (see FIG. 1) attached to the at least one traversable bridge apparatus 86. As shown in FIG. 1, the actuator 95 comprises one of, an electric solenoid 96, a pneumatic solenoid 98, an electric motor 100, or another suitable actuator. The electric motor 100 may comprise a servo motor 102 (see FIG. 1), a stepper motor 104 (see FIG. 1), or another suitable electric motor.

As shown in FIG. 1, the valve switch mechanism 88, in the form of the actuating control magnet assembly 92, further comprises a control magnet 105 coupled to the actuator 95. The control magnet 105 has a control magnet (CM) polarity 106. The actuator 95 is configured to operably actuate the control magnet 105 between an up position 108 (see FIG. 1) and a down position 110 (see FIG. 1). The control magnet 105 is configured to impart a magnetic force 112 (see FIG. 1) on a floating magnet 114 of each bi-stable valve 78, to push the floating magnet 114 down, to switch the bi-stable valve 78 between the valve closed state 80 and the valve open state 82, discussed in further detail below. Each floating magnet 114 has a floating magnet (FM) polarity 115 (see FIG. 1).

As shown in FIG. 1, the valve switch mechanism 88, in the form of the actuating control magnet assembly 92, may further optionally comprise one or more wiping magnets 116 attached to the at least one traversable bridge apparatus 86 and movable over the plurality of bi-stable valves 78. The one or more wiping magnets 116 are configured to reset one or more of the plurality of bi-stable valves 78 to be in the valve closed state 80 or the valve open state 82, prior to the control magnet 105 moving over the plurality of bi-stable valves 78 to selectively switch one or more of the plurality of bi-stable valves 78 between the valve closed state 80 and the valve open state 82.

Alternatively, instead of including one or more wiping magnets 116, the valve switch mechanism 88, in the form of the actuating control magnet assembly 92, may further optionally include or comprise one of, as shown in FIG. 1, an electromagnet 120, a solenoid-mounted control magnet 122 with a polarity 124 that is opposite the control magnet polarity 106 of the control magnet 105 and that is the same as the wiping magnet polarity 118 of the wiping magnet 116, a mechanism 125 to move a magnetic pole 126, or a mechanism 128 to block or decrease a magnetic strength 130.

The actuating control magnet assembly 92 is discussed in further detail below with respect to FIGS. 5A-5J.

Now referring to the valve switch mechanism 88 comprising the at least one actuating compliant mechanism assembly 94 (see FIGS. 1, 6A-6F), with the actuating compliant mechanism assembly 94, the control actuator 90 comprises an actuator 95a (see FIG. 1) comprising a linear actuator 95b, a rotary actuator 95c, or another suitable actuator. The actuator 95a may further comprise an electric actuator, a pneumatic actuator, or another suitable type of actuator. In one exemplary version, the actuator 95a is attached to the at least one traversable bridge apparatus 86.

As shown in FIG. 1, with the valve switch mechanism 88, in the form of the actuating compliant mechanism assembly 94, the plurality of bi-stable valves 78 of the bi-stable valve mechanism 76 comprise a plurality of vacuum ports 132 with a plurality of vacuum port covers 134 configured to open and close between the valve closed state 80 and the valve open state 82. The additional components of the actuating compliant mechanism assembly 94 are discussed in further detail below with respect to FIGS. 6A-6F.

The automated bi-stable valve system 10 splits the control system 84 from the bi-stable valve mechanism 76 to enable a valve density 136 (see FIG. 1), or valve densities, of the bi-stable valves 78 that is/are significantly higher than valve densities of known valve systems, thus providing a more scalable solution. With valve densities 136 that are higher, ply adhesion 74 to the plies 42, such as the cut plies 42a, is easier to control. The closer the ply adhesion 74 is the edges 66 of the plies 42, such as the cut plies 42a, the less chance there is of disturbing or picking up the waste material 64, or skeleton material or scrap material.

Figure 2:
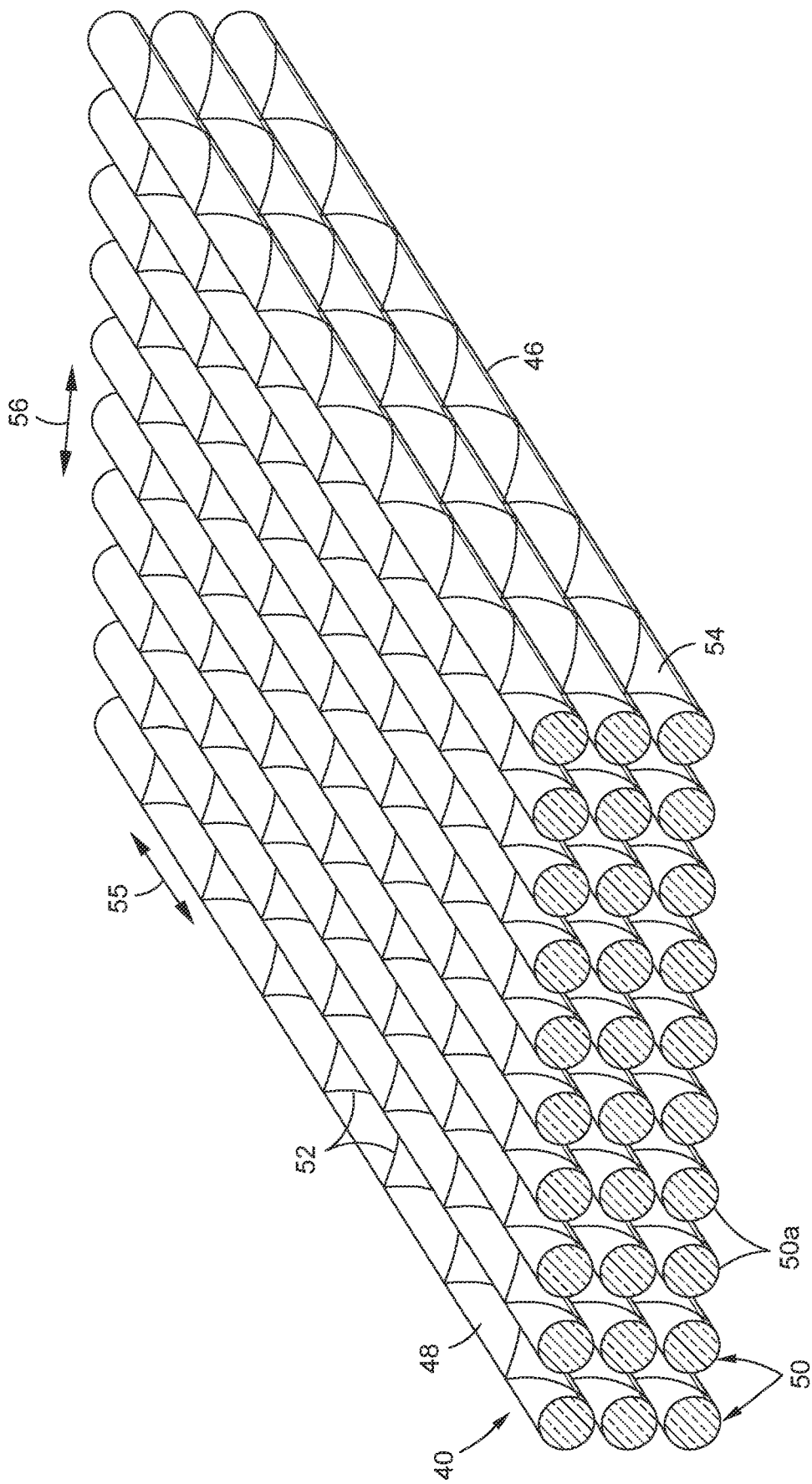
FIG. 2 is an illustration of a front perspective view of an exemplary version of fiber material having unidirectional fibers that may be used with versions of the automated material handling system and the automated bi-stable valve system of the disclosure.

Now referring to FIG. 2, FIG. 2 is an illustration of a front perspective view of an exemplary version of material 40, such as fiber material 48, having fibers 50, such as unidirectional fibers 50a, stitched together with threads 52, to form a stitched preform 54, that may be used with a version of the automated material handling system 12 discussed above, and picked up with a version of the automated bi-stable valve system 10 discussed above. The material 40, such as the fiber material 48 comprises dry fabric sheets 46 to form plies 42 (see FIG. 1). The fibers 50 may be made from natural and/or man-made materials such as carbon, fiberglass, graphite, and the like. The material 40, such as the fiber material 48 has stiffness in a fiber direction 55 (see FIG. 2) but has a low bending stiffness, or no stiffness, in a non-fiber direction 56 (see FIG. 2).

Now referring to FIG. 3, FIG. 3 is an illustration of a side perspective view of an exemplary version of a dry fabric roll 44 of material 40, such as composite material 40a, for example, raw composite material 40b, showing plies 42, such as cut plies 42a, cut into net shapes 58 of various geometric configurations and arranged in a ply nest 62. FIG. 3 further shows waste material 64, also referred to as skeleton material or scrap material, adjacent the plies 42, such as the cut plies 42a. The plies 42, such as the cut plies 42a, are cut and nested from the dry fabric roll 44 and are cut with a cutter apparatus 60 (see FIG. 4A), such as an automated cross-cutter apparatus 60a (see FIG. 4A), or another suitable cutter apparatus. The plies 42, such as the cut plies 42a, are configured to be picked up and placed by the robot 22 using the automated bi-stable valve system 10, and are configured to be separated from the remaining material, such as the remaining composite material, comprising the waste material 64, or skeleton material, that is not picked up. The plies 42, such as the cut plies 42a, that are selectively picked up from, for example, the work surface 65 (see FIG. 4A) by the robot 22 using the automated bi-stable valve system 10, may be laid directly on a tool or mold for laying up, or on a carrier apparatus, a mobile apparatus, or another suitable apparatus for forming or transport.

Figure 4A:
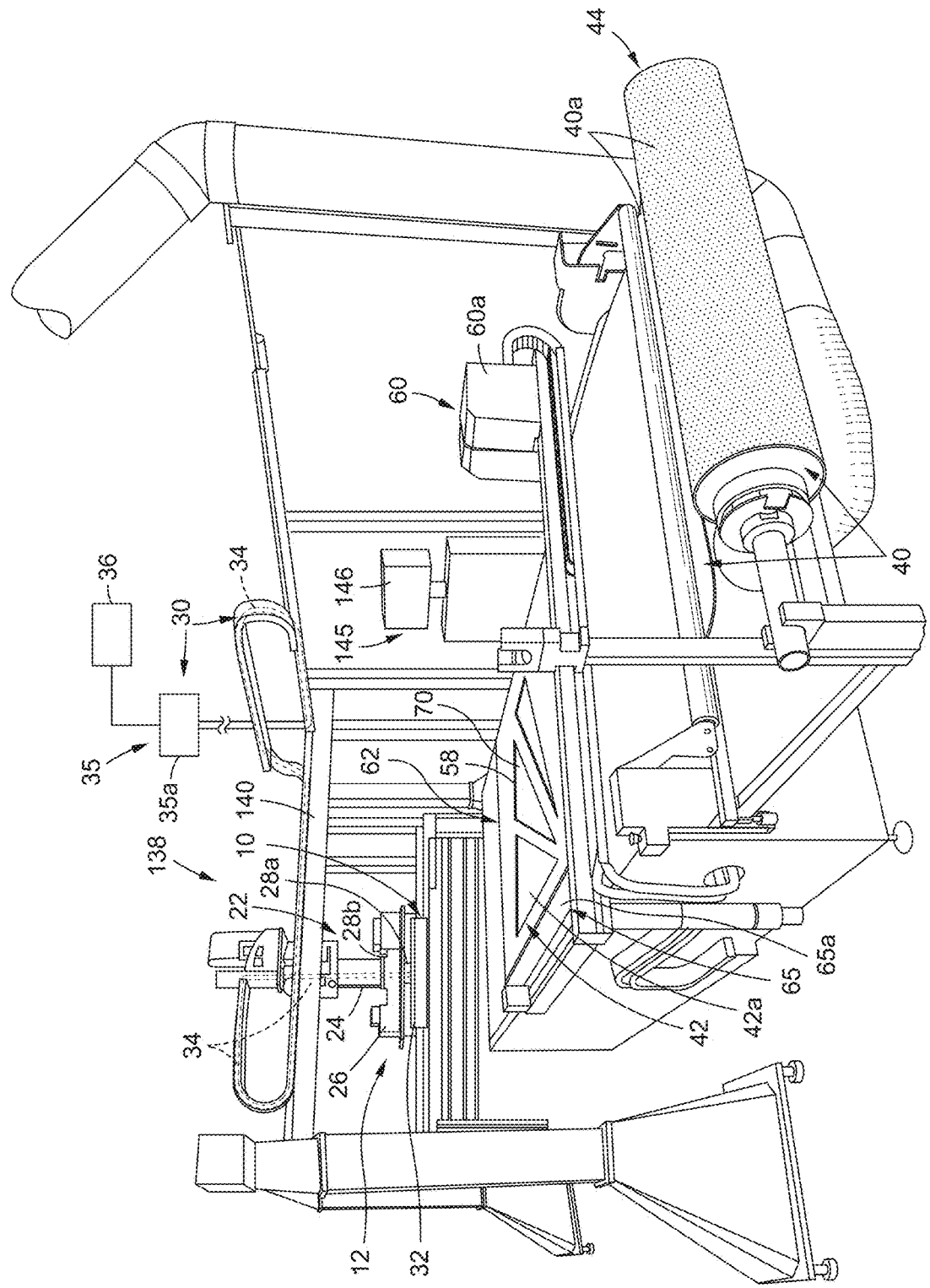
FIG. 4A is an illustration of a front perspective view of a production cell incorporating exemplary versions of an automated material handling system and an automated bi-stable valve system of the disclosure.

Now referring to FIG. 4A, FIG. 4A is an illustration of a front perspective view of a production cell 138 for performing the material handling process 16 (see FIG. 1) for composite manufacturing 18 (see FIG. 1), where the production cell 138 incorporates exemplary versions of the automated material handling system 12 and the automated bi-stable valve system 10 of the disclosure, as discussed above.

As shown in FIG. 4A, the production cell 138 includes a dry fabric roll 44 of material 40, such as composite material 40a, for example, carbon fabric, from which plies 42, such as cut plies 42a, are cut. As shown in FIG. 4A, the production cell 138 further includes the cutter apparatus 60, such as the automated cross-cutter apparatus 60a, for cutting plies 42, such as the cut plies 42a, from the dry fabric roll 44, into net shapes 58 of various geometric configurations and arranged in the ply nest 62. The production cell 138 further includes the work surface 65 (see FIG. 4A), such as a conveyor belt surface 65a, from which the plies 42, such as the cut plies 42a, in the ply nest 62 are moved after being cut with the cutter apparatus 60, such as the automated cross-cutter apparatus 60a.

As shown in FIG. 4A, the production cell 138 further includes the automated material handling system 12 comprising the robot 22, such as the pick-and-place operations robot 22a, and the vacuum system 30. As shown in FIG. 4A, the robot 22, such as the pick-and-place operations robot 22a, includes the arm 24 with the end effector 26. The automated bi-stable valve system 10 (see FIG. 4A) is coupled to the first end 28a (see FIG. 4A) of the end effector 26, and the second end 28b (see FIG. 4A) of the end effector 26 is coupled to the arm 24 of the robot 22. The automated bi-stable valve system 10 is held by the robot 22, via the end effector 26. As shown in FIG. 4A, the end effector 26 is mounted to a gantry 140. The gantry 140 is configured to move, and moves, the end effector 26 of the robot 22 over the one or more plies 42, such as one or more cut plies 42a, to be picked up, and lowers the end effector 26 with the attached automated bi-stable valve system 10, so that a bottom surface 142 (see FIG. 4B) of a bottom portion 144 (see FIG. 4B) of the automated bi-stable valve system 10 is in contact with the surface 70 of each of the one or more plies 42, such as the one or more cut plies 42a, to be picked up from the work surface 65, and removed from the waste material 64, or skeleton material.

As shown in FIG. 4A, the vacuum system 30 has the vacuum manifold 32 coupled to the automated bi-stable valve system 10, and the vacuum manifold 32 is coupled to the vacuum source 35, via a vacuum line 34. The vacuum manifold 32 distributes air 38 (see FIGS. 1, 5H) from the vacuum line 34 to the entire end effector 26. In one version, the vacuum manifold 32 is part of the end effector 26. In another version, the vacuum manifold 32 is coupled prior to the end effector 26. The vacuum power supply 36 (see FIG. 4A) is coupled to the vacuum source 35. The vacuum source 35 comprises a vacuum generator 35a (see FIG. 4A). However, the vacuum source 35 may comprise a blower or another suitable vacuum source. The vacuum system 30 is configured to pull air 38 (see FIGS. 1, 5H) in an air flow 38a (see FIGS. 1, 5H), or vacuum flow, through the automated bi-stable valve system 10 to pick up, and adhere or secure, the desired plies 42, such as cut plies 42a, to the bottom surface 142 of the bottom portion 144 of the automated bi-stable valve system 10.

The automated material handling system 12 and the automated bi-stable valve system 10 of the production cell 138 may be operated by an operator using a controller 145 (see FIG. 4A) for operatively controlling operations of the automated material handling system 12 and the automated bi-stable valve system 10, and other components of the production cell 138, including coordinating and controlling movements of the dry fabric roll 44, the cutter apparatus 60, such as the automated cross-cutter apparatus 60a, the work surface 65, such as the conveyor belt, the vacuum system 30, the gantry 140, and the end effector 26 with the attached the automated bi-stable valve system 10. The controller 145 may comprise a computer 146 (see FIG. 4A). The computer 146 may comprise a portable computer (PC), a programmable logic controller (PLC), or another suitable computer. In one version, the computer 146 uses a control program which may include a software program, or an algorithm, that determines how the material handling process 16 should progress and the sequential operation of the components of the production cell 138.

Figure 4B:
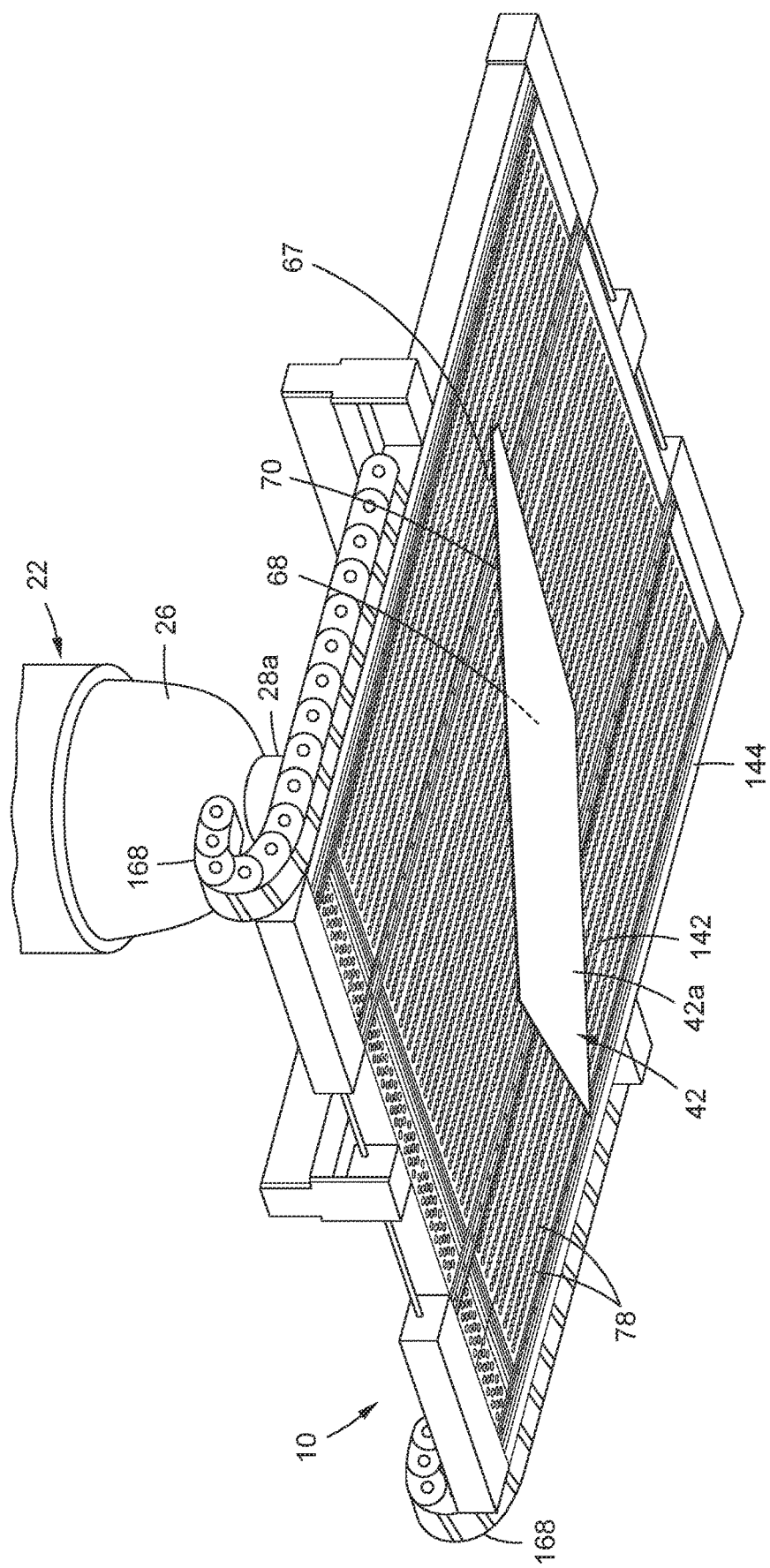
FIG. 4B is an illustration of an enlarged front perspective view of an exemplary version of an automated bi-stable valve system coupled to an end effector used in the production cell of FIG. 4A.

Now referring to FIG. 4B, FIG. 4B is an illustration of an enlarged front perspective view of an exemplary version of an automated bi-stable valve system 10 coupled to the end effector 26 of the robot 22 used in the production cell 138 of FIG. 4A. As shown in FIG. 4B, the automated bi-stable valve system 10 is coupled to the first end 28a of the end effector 26. As further shown in FIG. 4B, the automated bi-stable valve system 10 has a ply 42, such as a cut ply 42a, adhered, or coupled, to the bottom surface 142 of the bottom portion 144 of the automated bi-stable valve system 10. The automated bi-stable valve system 10 with the bi-stable valves 78 (see FIG. 4B) provides selective and discrete control of one or more adhesion zones 67 (see FIGS. 1, 4B) on the bi-stable valve mechanism 76. The one or more adhesion zones 67 correspond to adhesion areas 68 (see FIGS. 1, 4B) on the surface 70 (see FIG. 4B) of the ply 42, such as the cut ply 42a. FIG. 4B further shows power supply chains 168 coupled to the automated bi-stable valve system 10. The power supply chains 168 are mechanical machine elements made of plastic or metal that are configured to safely and reliably supply power, energy, signals, and/or vacuum to components on the traversable bridge apparatus 86 (see FIG. 5B). The power supply chains 168 are used to guide and protect one or more of, electrical wiring, cables, hoses, vacuum lines, and/or optical conductors that supply the power, energy, signals, and/or vacuum to components on the traversable bridge apparatus 86 that are in motion.

Now referring to FIGS. 5A-5J, FIGS. 5A-5J show a version of the automated bi-stable valve system 10, such as in the form of automated bi-stable valve system 10a, where the valve switch mechanism 88 comprises the actuating control magnet assembly 92.

Figure 5A:
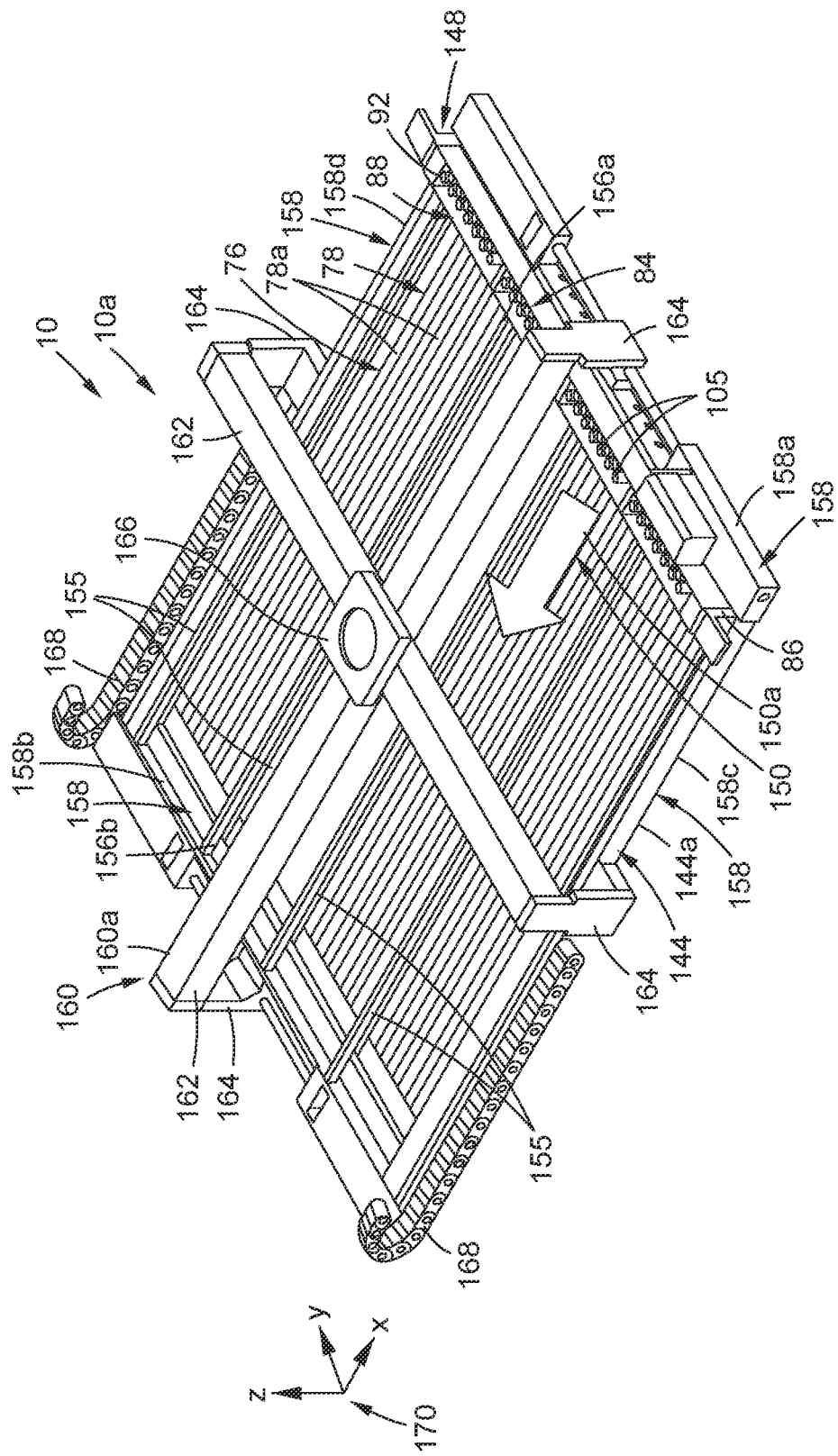
FIG. 5A is an illustration of a front perspective view of an exemplary version of an automated bi-stable valve system of the disclosure, showing a traversable bridge apparatus at a start position.
Figure 5B:
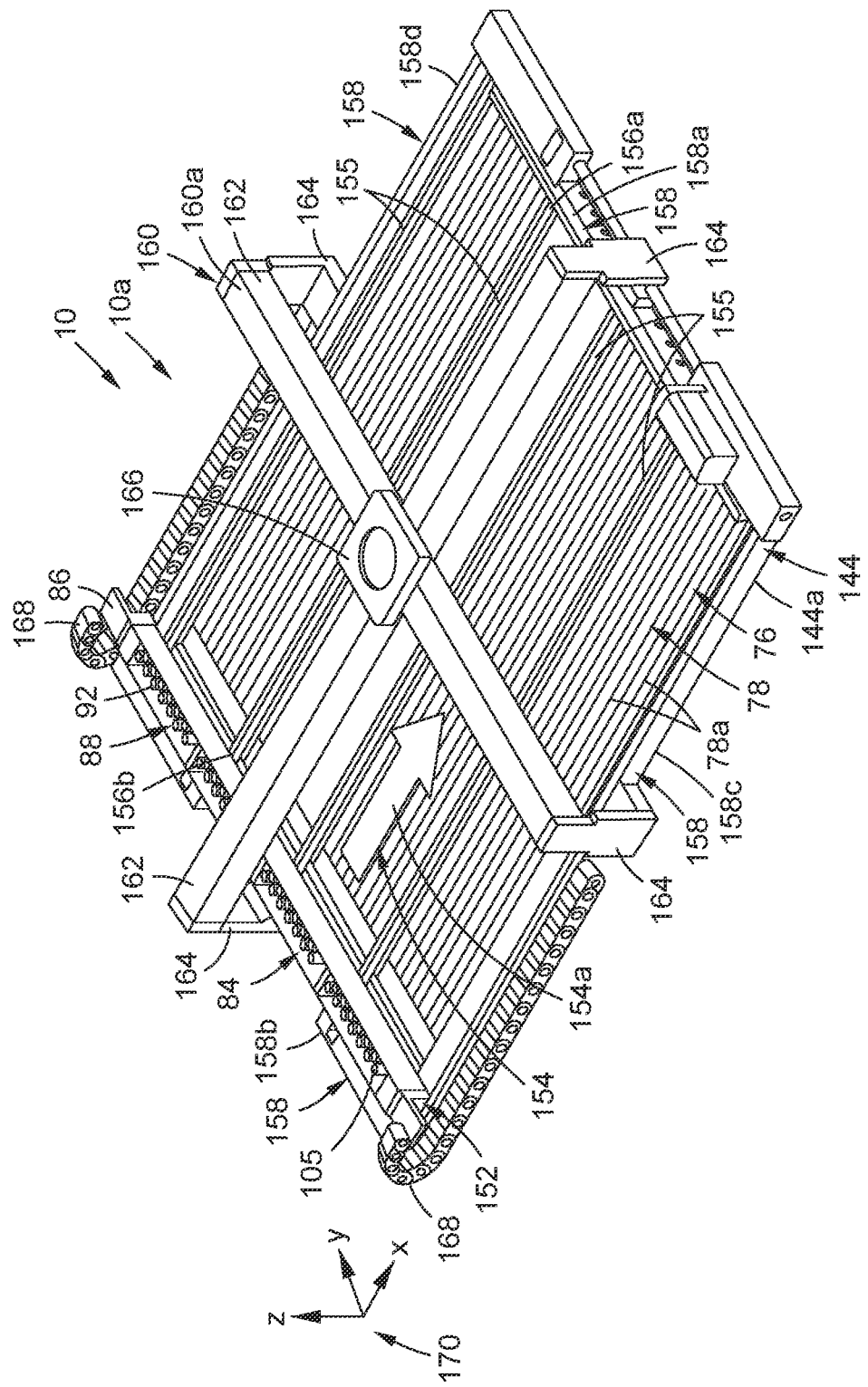
FIG. 5B is an illustration of a front perspective view of the automated bi-stable valve system of FIG. 5A, showing the traversable bridge apparatus at an end position.

Now referring to FIGS. 5A-5C, FIG. 5A is an illustration of a front perspective view of an exemplary version of the automated bi-stable valve system 10, such as in the form of automated bi-stable valve system 10a, of the disclosure, showing the traversable bridge apparatus 86 at a start position 148. The traversable bridge apparatus 86 is configured to travel, or traverse, across a plurality of rows 78a of bi-stable valves 78, in a first direction 150, such as a right-to-left-direction 150a. FIG. 5B is an illustration of a front perspective view of the automated bi-stable valve system 10, such as in the form of automated bi-stable valve system 10a, of FIG. 5A, showing the traversable bridge apparatus 86 at an end position 152, and configured to travel, or traverse, back across the plurality of rows 78a of bi-stable valves 78, in a second direction 154, such as a left-to-right direction 154a. Now referring to FIG. 5C, FIG. 5C is an illustration of a top view of the automated bi-stable valve system 10, such as in the form of automated bi-stable valve system 10a, of FIG. 5A, where the traversable bridge apparatus 86 is in the end position 152.

FIGS. 5A-5C show the bi-stable valve mechanism 76 comprising the plurality of bi-stable valves 78 in the plurality of rows 78a. FIGS. 5A-5C further show the control system 84 coupled to the bi-stable valve mechanism 76, and configured to operably control the plurality of bi-stable valves 78 of the bi-stable valve mechanism 76. The control system 84 comprises the traversable bridge apparatus 86 and the valve switch mechanism 88. The valve switch mechanism 88 is attached to the traversable bridge apparatus 86, and movable, via the traversable bridge apparatus 86, over the plurality of bi-stable valves 78. The traversable bridge apparatus 86 is coupled to a plurality of rails 155 (see FIGS. 5A-5C) that are spaced apart from each other and run parallel to each other. Each rail 155 has a first end 156a (see FIGS. 5A-5C) coupled to a side 158 (see FIGS. 5A-5C), such as a first side 158a (see FIGS. 5A-5C), of the bottom portion 144 (see FIGS. 5A-5C), and has a second end 156b (see FIGS. 5A-5C), coupled to a side 158, such as a second side 158b (see FIGS. 5A-5C), of the bottom portion 144. The bottom portion 144 further has sides 158, including a third side 158c (see FIGS. 5A-5C) and a fourth side 158d (see FIGS. 5A-5C).

In one version, as shown in FIGS. 5A-5C, the automated bi-stable valve system 10, such as in the form of automated bi-stable valve system 10a, has one traversable bridge apparatus 86. However, in other versions the automated bi-stable valve system 10, such as in the form of automated bi-stable valve system 10a, has more than one traversable bridge apparatus 86 positioned parallel to each other and traversing across the bi-stable valves 78 in parallel.

The valve switch mechanism 88 is configured to switch one or more of the plurality of bi-stable valves 78 between the valve closed state 80 (see FIGS. 1, 5G) and the valve open state 82 (see FIGS. 1, 5H), to allow for selective control of one or more adhesion zones 67 (see FIGS. 1, 4B) on the bi-stable valve mechanism 76, the one or more adhesion zones 67 corresponding to one or more adhesion areas 68 (see FIGS. 1, 4B) on the surface 70 (see FIGS. 1, 4A-4B) of the material 40 (see FIG. 1), such as composite material 40a (see FIG. 1), in the form of one or more plies 42 (see FIGS. 1, 4A-4B), such as one or more cut plies 42a (see FIGS. 1, 4A-4B), to be selectively picked up and placed during the material handling process 16 (see FIG. 1). The automated bi-stable valve system 10 is designed to split the control system 84 from the bi-stable valve mechanism 76 to enable significantly higher valve densities 136 (see FIG. 1).

FIGS. 5A-5C show the valve switch mechanism 88, in the form of the actuating control magnet assembly 92, comprising control magnets 105. The control magnets 105 are carried by the traversable bridge apparatus 86. As shown in FIGS. 5A-5C, the automated bi-stable valve system 10, such as in the form of automated bi-stable valve system 10a, comprises the bottom portion 144 with the rows 78a of bi-stable valves 78. As shown in FIGS. 5A-5C, the bottom portion 144 is in the form of a plate structure 144a housing rows 78a of bi-stable valves 78. The bottom portion 144 may also be in another suitable form or structure.

As shown in FIGS. 5A-5C, the automated bi-stable valve system 10, such as in the form of automated bi-stable valve system 10a, further comprises a top portion 160, such as in the form of a cross-bar structure 160a. The top portion 160 may also be in another suitable form or structure. As shown in FIGS. 5A-5C, the top portion 160, such as in the form of the cross-bar structure 160a, comprises elongated bar portions 162 with bracket ends 164 attached to sides 158 of the bottom portion 144, such as the plate structure 144a. The top portion 160, such as in the form of the cross-bar structure 160a, further comprises an attachment portion 166 (see FIGS. 5A-5C) positioned at the intersection of the elongated bar portions 162 and coupled to one or both of the elongated bar portions 162. The attachment portion 166 is configured for attachment to the first end 28a (see FIGS. 4A-4B) of the end effector 26 (see FIGS. 4A-4B) of the robot 22 (see FIGS. 4A-4B).

As shown in FIGS. 5A-5C, the automated bi-stable valve system 10, such as in the form of automated bi-stable valve system 10a, further comprises power supply chains 168 coupled to the third side 158c (see FIG. 5A) and the fourth side 158d (see FIG. 5A), respectively, of the bottom portion 144 (see FIG. 5A) of the automated bi-stable valve system 10. The power supply chains 168 are configured to safely and reliably supply power, energy, signals, and/or vacuum to components on the traversable bridge apparatus 86 (see FIGS. 5A-5C). The power supply chains 168 are used to guide and protect one or more of, electrical wiring, cables, hoses, vacuum lines, and/or optical conductors that supply the power, energy, signals, and/or vacuum to components on the traversable bridge apparatus 86 that are in motion. FIGS. 5A-5B further shows an orthogonal x, y, z coordinate system 170, in which the x-axis corresponds to the direction of travel of the traversable bridge apparatus 86, and the y-axis corresponds to the direction of the length of the traversable bridge apparatus 86.

Figure 5D:
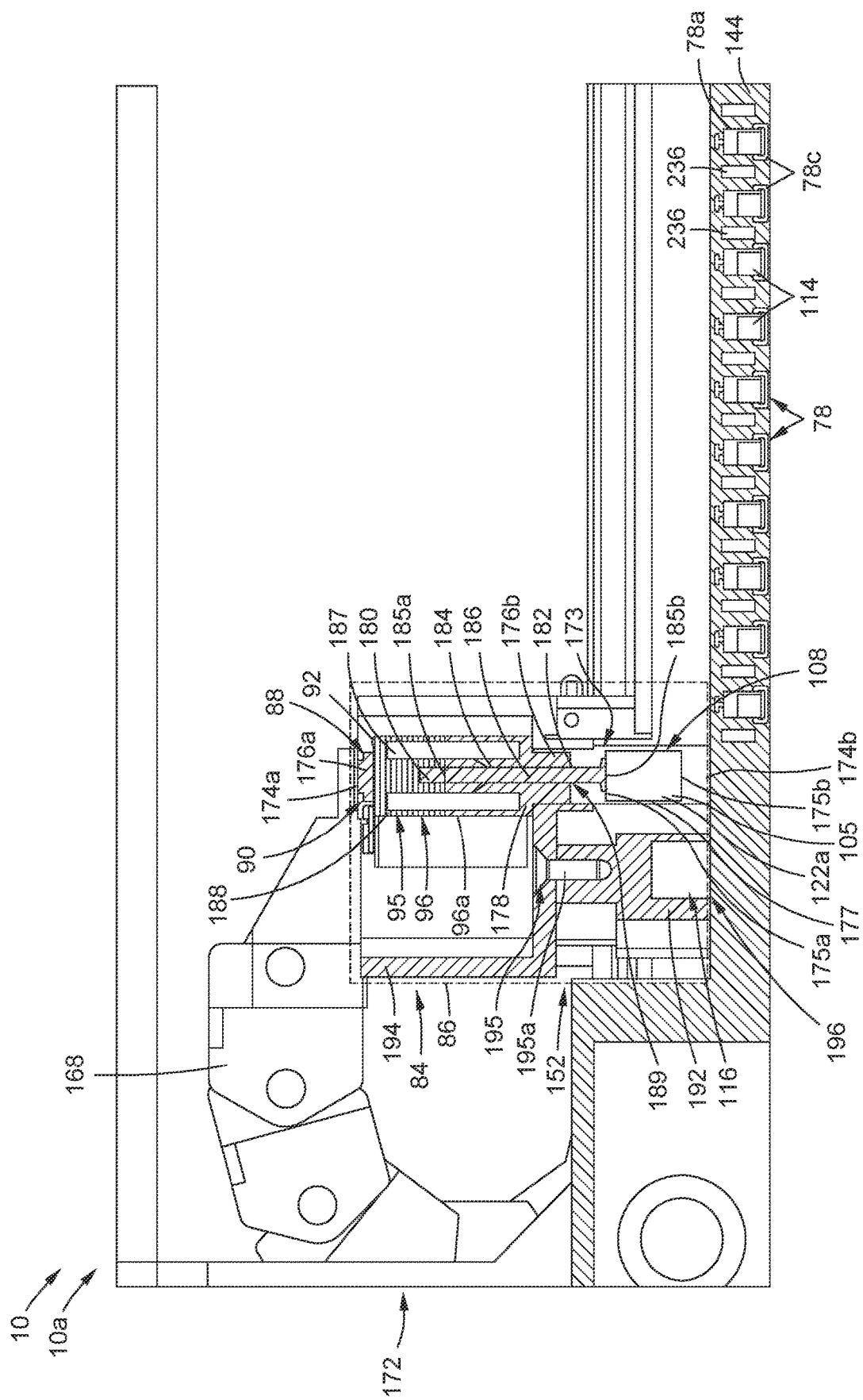
FIG. 5D is an illustration of an enlarged cross-section view of a portion of the automated bi-stable valve system, taken along lines 5D-5D, of FIG. 5C.

Now referring to FIG. 5D, FIG. 5D is an illustration of an enlarged cross-section view of a portion 172 of the automated bi-stable valve system 10, such as in the form of automated bi-stable valve system 10a, taken along lines 5D-5D, of FIG. 5C. FIG. 5D shows the control system 84 comprising the traversable bridge apparatus 86 and the valve switch mechanism 88. The power supply chain 168 is coupled to the traversable bridge apparatus 86. The traversable bridge apparatus 86 is in the end position 152. FIG. 5D further shows the valve switch mechanism 88, in the form of the actuating control magnet assembly 92, showing a control magnet 105 within the traversable bridge apparatus 86. FIG. 5D further shows the control actuator 90 comprising the actuator 95, in the form of an electric solenoid 96, attached to, and housed within, the traversable bridge apparatus 86. The electric solenoid 96 comprises a push type tubular linear electric solenoid 96a (see FIG. 5D). In other versions, the electric solenoid 96 may comprise a pull type solenoid, a rotary solenoid, or another suitable type of electric solenoid. Alternatively, the actuator 95 may comprise a pneumatic solenoid 98 (see FIG. 1), an electric motor 100 (see FIG. 1), such as a servo motor 102 (see FIG. 1) or a stepper motor 104 (see FIG. 1), or another suitable actuator.

As shown in FIG. 5D, the control magnet 105 is coupled to, or mounted to, the electric solenoid 96 and is in the form of a solenoid-mounted control magnet 122a. The control magnet 105 coupled to, or mounted to, the electric solenoid 96 is also referred to as a control magnet/solenoid assembly 173 (see FIG. 5D) and has a first end 174a (see FIG. 5D) and a second end 174b (see FIG. 5D). As shown in FIG. 5D, the control magnet 104 has a first end 175a and a second end 175b, and is positioned in a lower slot portion 177 of the control magnet/solenoid assembly 173. As further shown in FIG. 5D, the electric solenoid 96, such as the push type tubular linear electric solenoid 96a, comprises a first end 176a, a second end 176b, and a cylindrical body 178 formed between the first end 176a and the second end 176b. The cylindrical body 178 has an interior central channel 180 formed through a portion of the cylindrical body 178 and extends through the interior central channel 180 from an opening 182 at the second end 176b of the electric solenoid 96.

As further shown in FIG. 5D, the electric solenoid 96, such as the push type tubular linear electric solenoid 96a, comprises a plunger 184, such as a steel plunger, having a first end 185a, a second end 185b, and an elongated shaft body 186 formed between the first end 185a and the second end 185b. The first end 185a of the plunger 184 is positioned within the interior central channel 180 of the cylindrical body 178 of the electric solenoid 96, and the second end 185b of the plunger 184 is coupled, or attached, to the first end 175a of the control magnet 105. The plunger 184 is configured to push out through the opening 182 in the second end 176b of the electric solenoid 96.

As further shown in FIG. 5D, the electric solenoid 96, such as the push type tubular linear electric solenoid 96a, comprises a coil 187 within the cylindrical body 178 of the electric solenoid 96 and surrounding the first end 185a of the plunger 184 within the interior central channel 180. The control magnet/solenoid assembly 173 further comprises a spring 188 attached at the first end 185a of the plunger 184 of the electric solenoid 96. The spring 188 acts as a spring return to move the plunger 184 upward from an energized position, to a de-energized position on loss of power, and in turn, to move the control magnet 105 upward from the down position 110 (see FIGS. 1, 5F), to the up position 108 (see FIGS. 1, 5D). Alternatively, the control magnet/solenoid assembly 173 may comprise other means to move the plunger 184 upward to a de-energized position. The control magnet/solenoid assembly 173 may further comprise a plunger stop to limit travel of the plunger 184, seals, bushings, or other suitable components of known push type tubular linear electric solenoids.

The electric solenoid 96, such as the push type tubular linear electric solenoid 96a, is configured to operably actuate the plunger 184 between an up position 189 (see FIG. 5D) and a down position 190 (see FIG. 5F), which in turn, actuates the control magnet 105 between the up position 108 (see FIGS. 1, 5D) and the down position 110 (see FIGS. 1, 5F). When the coil 187 is energized, for example, with electricity or current, a magnetic field is generated, which induces a magnetic field in the plunger 184 and causes the plunger 184 to move downwardly from the up position 189 to the down position 190, and push the control magnet 105 from the up position 108 to the down position 110. When the coil 187 is de-energized, the plunger 184 moves upwardly from the down position 190 to the up position 189, and returns to the original position, and the control magnet 105 is moved from the down position 110 back up to the up position 108.

FIG. 5D further shows the valve switch mechanism 88, in the form of the actuating control magnet assembly 92, having one or more wiping magnets 116 attached to, and housed within a base portion 192, or lower portion, of the traversable bridge apparatus 86. As shown in FIG. 5D, the base portion 192, or lower portion, of the traversable bridge apparatus 86 is attached to an upper portion 194 of the traversable bridge apparatus 86, via one or more attachment elements 195, such as one or more screws 195a, or other suitable attachment elements.

Each of the one or more wiping magnets 116 is in a fixed position 196, and when the traversable bridge apparatus 86 moves across the plurality of bi-stable valves 78, the traversable bridge apparatus 86, in turn, moves the one or more wiping magnets 116 over the plurality of bi-stable valves 78 (see FIG. 5D), which include the floating magnets 114. The one or more wiping magnets 116 traverse in the right-to-left direction 150a (see FIG. 5A) or the left-to-right direction 154a (see FIG. 5B), and not in an up-and-down vertical direction 208 (see FIG. 5F). The one or more wiping magnets 116 are configured to reset one or more of the plurality of bi-stable valves 78 to be in the valve closed state 80 (see FIGS. 1, 5G) or the valve open state 82 (see FIGS. 1, 5H), prior to the control magnet 105 moving over the plurality of bi-stable valves 78, to selectively switch one or more of the plurality of bi-stable valves 78 between the valve closed state 80 and the valve open state 82. Alternatively, instead of using the wiping magnet 116, the valve switch mechanism 88, in the form of the actuating control magnet assembly 92, may further optionally include or comprise one of, as shown in FIG. 1, an electromagnet 120; a solenoid-mounted control magnet 122 with a polarity 124 that is opposite the control magnet polarity 106 of the control magnet 105, and with a polarity 124 that is the same as the wiping magnet polarity 118 of the wiping magnet 116; a mechanism 125 to move a magnetic pole 126; or a mechanism 128 to block or decrease a magnetic strength 130. FIG. 5D further shows a row 78a of bi-stable valves 78 housed in the bottom portion 144 of the automated bi-stable valve system 10, such as in the form of automated bi-stable valve system 10a. Adjacent bi-stable valves 78c (see FIG. 5D) are separated by gap areas 236 (see FIGS. 5D, 5G-5H).

Figure 5E:
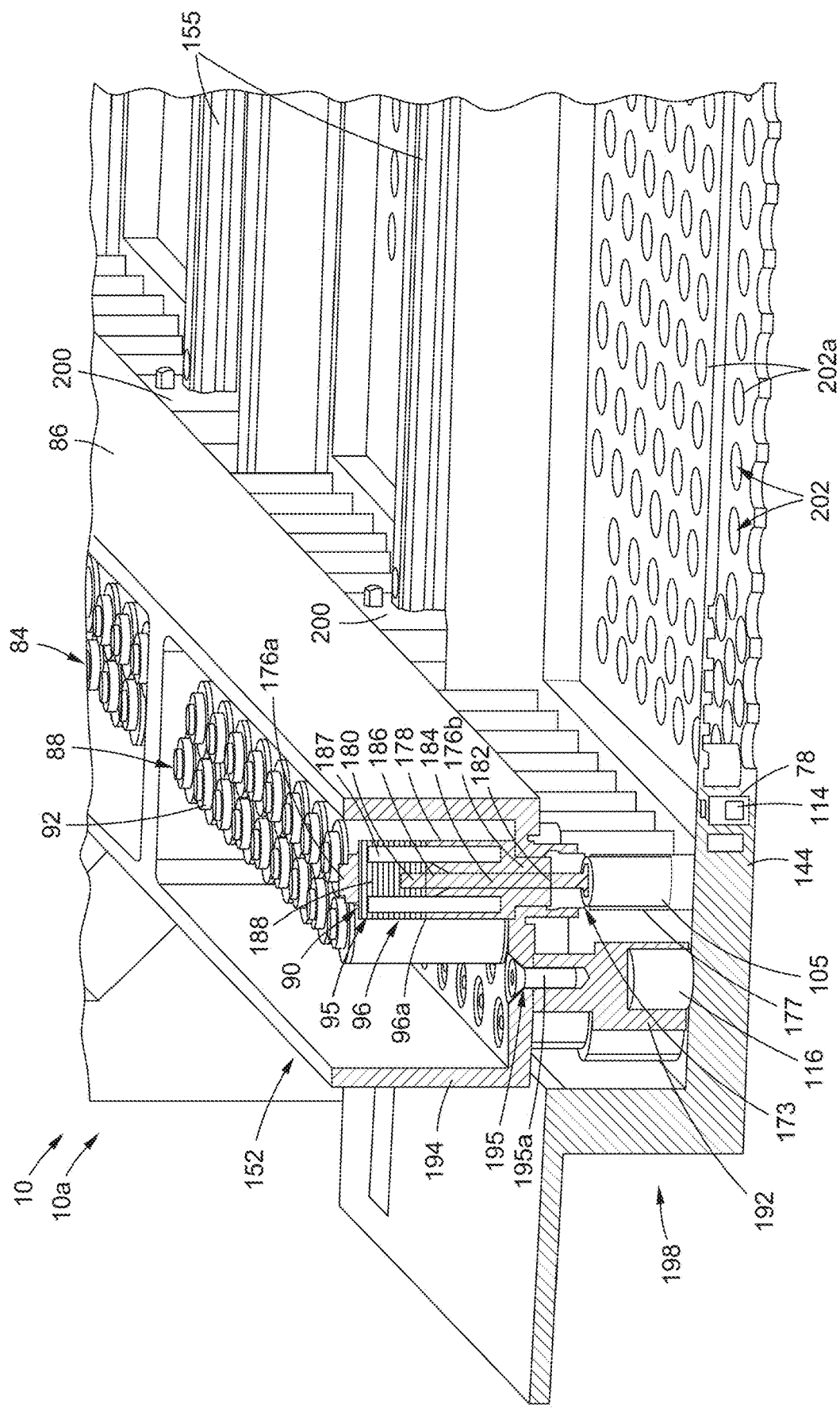
FIG. 5E is an illustration of an enlarged sectional perspective side view of a portion of the automated bi-stable valve system of FIG. 5B.

Now referring to FIG. 5E, FIG. 5E is an illustration of an enlarged sectional perspective side view of a portion 198 of the automated bi-stable valve system 10, such as in the form of automated bi-stable valve system 10a, of FIG. 5A. FIG. 5E shows the control system 84 comprising the traversable bridge apparatus 86 and the valve switch mechanism 88. FIG. 5E shows the traversable bridge apparatus 86 in the end position 152, and shows the base portion 192 and the upper portion 194 of the traversable bridge apparatus 86 connected together with the attachment elements 195, such as the screws 195a.

FIG. 5E shows the valve switch mechanism 88, in the form of the actuating control magnet assembly 92, with the control magnets 105 carried and housed by the traversable bridge apparatus 86. FIG. 5E further shows rails 155 on which the traversable bridge apparatus 86 traverses or moves. The traversable bridge apparatus 86 has guide elements 200 (see FIG. 5E) coupled to the traversable bridge apparatus 86. The guide elements 200 are configured to slide, or move, along the rails 155, and in turn, slide, or move, the traversable bridge apparatus 86 along the rails 155.

FIG. 5E further shows the control actuator 90 comprising the actuator 95, in the form of the electric solenoid 96, such as the push type tubular linear electric solenoid 96a, attached to the traversable bridge apparatus 86. FIG. 5E shows the control magnet 105 within the lower slot portion 177 of the control magnet/solenoid assembly 173, and shows the control magnet 105 coupled to, or mounted to, the electric solenoid 96. FIG. 5E further shows the first end 176a, the second end 176b, the cylindrical body 178, the interior central channel 180, the opening 182, the plunger 184 with the elongated shaft body 186, the coil 187, and the spring 188.

FIG. 5E further shows the valve switch mechanism 88, in the form of the actuating control magnet assembly 92, having one or more wiping magnets 116 in the fixed position 196 and attached to, and housed within, the base portion 192 of the traversable bridge apparatus 86. The one or more wiping magnets 116 are configured to move over the bi-stable valves 78. FIG. 5E further shows a bi-stable valve 78 with a floating magnet 114 housed in the bottom portion 144 of the automated bi-stable valve system 10, such as in the form of automated bi-stable valve system 10a. FIG. 5E further shows bi-stable valve openings 202 arranged in rows 202a. Each bi-stable valve opening 202 is configured to receive and house a bi-stable valve 78 containing a floating magnet 114.

Now referring to FIG. 5F, FIG. 5F is an illustration of an enlarged sectional side view of a portion 204 of the control system 84 comprising the valve switch mechanism 88 in the form of the actuating control magnet assembly 92 of the automated bi-stable valve system 10, such as in the form of automated bi-stable valve system 10a, of FIG. 5D. FIG. 5F shows magnetic poles 126 of the control magnet 105, the wiping magnet 116, and the floating magnets 114. FIG. 5F shows the valve switch mechanism 88, in the form of the actuating control magnet assembly 92, with the control magnet 105 coupled to, or mounted to, the actuator 95 comprising the electric solenoid 96, such as the push type tubular linear electric solenoid 96a. As shown in FIG. 5F, the control magnet 105 has a control magnet polarity 106 (see FIG. 1) with magnetic poles 126 comprising a north (N) pole 206a at a first end 175a, or upper end, and a south (S) pole 206b at a second end 175b, or lower end, of the control magnet 105. The actuator 95, such as the electric solenoid 96, is configured to operably actuate the control magnet 105 between the up position 108 (see FIGS. 1, 5D) and the down position 110 (see FIGS. 1, 5F), and the plunger 184 is in a down position 190 (see FIG. 5F) and is configured to move in an up-and-down vertical direction 208 (see FIG. 5F). FIG. 5F further shows the spring 188 coupled to the plunger 184.

FIG. 5F shows the control magnet 105 positioned directly above a floating magnet 114 and in line with the floating magnet 114. The control magnet 105 is configured to impart a magnetic force 112 (see FIG. 1) on the floating magnet 114 of each bi-stable valve 78 (see FIG. 5F), to push the floating magnet 114 down, to switch the bi-stable valve 78 between the valve closed state 80 and the valve open state 82. FIG. 5F further shows the floating magnets 114 each having a floating magnet polarity 115 (see FIG. 1) with magnetic poles 126 comprising the south (S) pole 206b at a first end 210a, or upper end, and the north (N) pole 206a at a second end 210b, or lower end, of the floating magnets 114.

FIG. 5F further shows the wiping magnet 116 having a wiping magnet polarity 118 (see FIG. 1) with magnetic poles 126 comprising the south (S) pole 206b at a first end 212a, or upper end, and the north (N) pole 206a at a second end 212b, or lower end, of the wiping magnet 116. As shown in FIG. 5F, the wiping magnet 116 has the same polarity, with the magnetic poles 126 in the same positions as the floating magnets 114, and the control magnet 105 has the opposite polarity, with the magnetic poles 126 in opposite positions to the wiping magnet 116 and the floating magnets 114. The wiping magnet 116 travels in front of the control magnet 105 and closes or opens all the bi-stable valves 78. The control magnet 105 follows and is able to selectively open or the bi-stable valves 78, as needed.

Now referring to FIGS. 5G-5H, FIG. 5G, FIG. 5G is an illustration of an enlarged sectional side view of a bi-stable valve 78, with a floating magnet 114, of the actuating control magnet assembly 92, of the automated bi-stable valve system 10, such as in the form of the automated bi-stable valve system 10a, of FIG. 5F, showing the bi-stable valve 78 in the valve closed state 80. FIG. 5H is an illustration of an enlarged sectional side view of a bi-stable valve 78 with a floating magnet 114 of the actuating control magnet assembly 92 of the automated bi-stable valve system 10, such as in the form of automated bi-stable valve system 10a, of FIG. 5F, showing the bi-stable valve 78 in the valve open state 82.

As shown in FIGS. 5G-5H, the bi-stable valve 78 has a first end 214a, a second end 214b, and a cylindrical valve body 215 formed between the first end 214a and the second end 214b. As further shown in FIGS. 5G-5H, the cylindrical valve body 215 has an interior portion 216 that houses the floating magnet 114. As further shown in FIGS. 5G-5H, the bi-stable valve 78 has a non-ferrous sleeve 218 coupled to, or integral with, an exterior 220 of the bi-stable valve 78. The non-ferrous sleeve 218 is made of a non-ferrous material that is not magnetic. The non-ferrous material may comprise a metal or alloy that does not have iron (non-iron metal or non-iron alloy), does not have steel (non-steel metal or non-steel alloy), or does not have iron or steel components. For example, the non-ferrous material may comprise a metal such as copper, aluminum, nickel, zinc, lead, tin, manganese, brass, bronze, or another suitable non-ferrous metal material. The non-ferrous material may also comprise plastics, composites, or other suitable non-ferrous materials. Further, the cylindrical valve body 215 is preferably made of a non-ferrous material that is not magnetic, and similar to the non-ferrous material of the non-ferrous sleeve 218.

As shown in FIGS. 5G-5H, the non-ferrous sleeve 218 is coupled, or attached, to a first ferrous element 222, such as a first ferrous plate 222a, for example, an upper ferrous plate, attached at the first end 214a of the bi-stable valve 78. The first ferrous element 222, such as the first ferrous plate 222a, is magnetic and is made of a ferrous material, such as iron, steel, an alloy of iron or steel, or another suitable ferrous material. The first ferrous element 222, such as the first ferrous plate 222a, has an opening 224 (see FIGS. 5G-5H) formed through the first ferrous element 222, such as the first ferrous plate 222a.

As shown in FIGS. 5G-5H, the non-ferrous sleeve 218 is coupled, or attached, to a second ferrous element 225, such as a second ferrous plate 225a, for example, a lower ferrous plate, attached at the second end 214b of the bi-stable valve 78. The second ferrous element 225, such as the second ferrous plate 225a, is magnetic and is made of a ferrous material, such as iron, steel, an alloy of iron or steel, or another suitable ferrous material. The second ferrous element 225, such as the second ferrous plate 225a, has an opening 226 (see FIGS. 5G-5H) formed through the second ferrous element 225, such as the second ferrous plate 225a.

As shown in FIGS. 5G-5H, each bi-stable valve 78 further comprises a seal 228 adjacent to the first ferrous element 222, such as the first ferrous plate 222a. The seal 228 has an opening 230 (see FIGS. 5G-5H) formed through the seal 228. The opening 224 in the first ferrous element 222 and the opening 230 in the seal 228 are preferably aligned and open to a channel 232 (see FIGS. 5G-5H) through which air flow 38a (see FIG. 5H), for example, vacuum flow, flowing in an air flow path 38b (see FIG. 5H) can flow, when the floating magnet 114 is in the valve open state 82. The first end 214a of each of the bi-stable valves 78 is open at the top and connected, via the channel 232, that runs along the top of the bi-stable valves 78. The seal 228 may be made of rubber, silicone rubber, nylon, plastic, or another suitably flexible and air tight material.

As shown in FIGS. 5G-5H, each bi-stable valve 78 further comprises a bottom bumper 234 attached to the bottom end of the interior portion 216 of the cylindrical valve body 215. The bottom bumper 234 is designed to prevent, or avoid, damage to the floating magnet 114, when the floating magnet 114 contacts the bottom end of the interior portion 216 and moves downwardly within the bi-stable valve 78. The bottom bumper 234 may be made of rubber, silicone rubber, nylon, plastic, or another suitably flexible material.

As shown in FIGS. 5G-5H, the bi-stable valve 78 further comprises a magnetic shielding 235, or ferrous shielding, positioned on, and covering, sides of the non-ferrous sleeve 218 of the bi-stable valve 78, to limit, or avoid, magnetic interference of adjacent bi-stable valves 78c (see FIG. 5D). In some versions, the magnetic shielding 235 may also cover part of the upper surface at the first end 214a of the bi-stable valve 78 and may also cover part of the lower surface at the second end 214b of the bi-stable valve 78. The design of the magnetic shielding 235 is dependent on the valve density 136 (see FIG. 1) and overall design of the bi-stable valve 78. The magnetic shielding 235 is magnetic and is made of a ferrous material, such as iron, steel, an alloy of iron or steel, or another suitable ferrous material As further shown in FIGS. 5F-5H, the bi-stable valves 78 have gap areas 236 between adjacent bi-stable valves 78c (see FIG. 5D). The gap areas 236 are formed between sides of the magnetic shielding 235 between adjacent bi-stable valves 78c. The gap areas 236 act to limit, or avoid, magnetic interference between adjacent bi-stable valves 78c.

As shown in FIGS. 5G-5H, the bi-stable valve 78 further comprises the floating magnet 114 within the non-ferrous sleeve 218 that is movable between the first ferrous element 222, or first ferrous plate 222a, and the second ferrous element 225, or second ferrous plate 225a. As shown in FIG. 5G, the floating magnet 114 is in an up position 237 and prevents air flow 38a (see FIG. 5H), when the bi-stable valve 78 is in the valve closed state 80. In the up position 237, as shown in FIG. 5G, the first end 210a of the floating magnet 114 is adjacent the bottom of the seal 228 and the floating magnet 114 blocks the opening 230 in the seal 228 and blocks the opening 224 in the first ferrous element 222, to cause the bi-stable valve 78 to be in the valve closed state 80.

As shown in FIG. 5H, the floating magnet 114 is in a down position 238 and allows air flow 38a, when the bi-stable valve 78 is in the valve open state 82. In the down position 238, as shown in FIG. 5H, the second end 210b of the floating magnet 114 is adjacent the top of the bottom bumper 234, and the first end 210a of the floating magnet 114 is away from the bottom of the seal 228 to unblock the opening 230 in the seal 228 and to unblock the opening 224 in the first ferrous element 222, to cause the bi-stable valve 78 to be in the valve open state 82. FIG. 5H further shows that when the bi-stable valve 78 is in the valve open state 82, the air flow 38a, for example, vacuum flow, flows in the air flow path 38b from the opening 226 in the second ferrous element 225 at the second end 214b of the bi-stable valve 78, through the interior portion 216 of the cylindrical valve body 215, out the opening 230 in the seal 228, out the opening 224 in the first ferrous element 222, and into the channel 232, where it connects with the vacuum system 30 (see FIG. 1).

The control magnet 105 has a strength 107 (see FIG. 1) sufficient to overcome coupling of each floating magnet 114 and the floating magnet's 114 associated first ferrous element 222, such as the first ferrous plate 222a. The control magnet 105 is configured to impart a magnetic force 112 (see FIG. 1) on the floating magnet 114, to push the floating magnet 114 down to the down position 238 (see FIG. 5H), to switch the bi-stable valve 78 between the valve closed state 80 and the valve open state 82.

As the wiping magnet 116 traverses across the bi-stable valves 78, the floating magnet's 114 magnetic attraction to the wiping magnet 116 is greater than the floating magnet's magnetic attraction to the second ferrous element 225, such as the second ferrous plate 225a, for example, the lower ferrous plate. The floating magnet 114 therefore is pulled up to the up position 237 (see FIG. 5G), and towards the wiping magnet 116, and thus closes the bi-stable valves 78 to the valve closed state 80. The control magnets 105, for example, the solenoid-mounted control magnets 122a, are outside of the magnetic area of effect of the floating magnets 114, when the plunger 184 of the actuator 95, such as the electric solenoid 96, is in the up position 189 (see FIG. 5D), and thus the control magnets 105, for example, the solenoid-mounted control magnets 122a, do not affect the state of the bi-stable valves 78. When the plunger 184 of the actuator 95, such as the electric solenoid 96, is in the down position 190 (see FIG. 5F), the control magnet 105 imparts the magnetic force 112 (see FIG. 1) on the floating magnet 114 that is greater than the floating magnet's 114 magnetic attraction to the first ferrous element 222, such as the first ferrous plate 222a, for example, the upper ferrous plate. That magnetic force 112 pushes the floating magnet 114 down, switching the bi-stable valve 78 to the valve open state 82.

Now referring to FIG. 5I, FIG. 5I is an illustration of an enlarged cross-section view of a portion 172a of the automated bi-stable valve system 10, such as in the form of automated bi-stable valve system 10a, of FIG. 5D, showing bi-stable valves 78 in the valve closed state 80 and showing bi-stable valves 78 in the valve open state 82. As shown in FIG. 5I, the bi-stable valves 78 include floating magnets 114. FIG. 5I shows a first set 78d of bi-stable valves 78 in the valve closed state 80 with a first set 114a of floating magnets 114 in the up position 237. FIG. 5I further shows a second set 78e of bi-stable valves 78 in the valve closed state 80 with a second set 114b of floating magnets 114 in the up position 237. The first set 78d and the second set 78e of bi-stable valves 78 are each positioned above a ply 42, such as a cut ply 42a, on a work surface 65, such as a table or a conveyor belt, or another suitable surface, where each ply 42, such as the cut ply 42a, is to be picked up with the automated bi-stable valve system 10, such as in the form of automated bi-stable valve system 10a.

FIG. 5I further shows a third set 78f of bi-stable valves 78 in the valve open state 82 with a third set 114c of floating magnets 114 in the down position 238. FIG. 5I further shows a fourth set 78g of bi-stable valves 78 in the valve open state 82 with a fourth set 114d of floating magnets 114 in the down position 238. The third set 78f and the fourth set 78g of bi-stable valves 78 are each positioned above portions 64a of waste material 64, on the work surface 65, that will not be picked up with the automated bi-stable valve system 10, such as in the form of automated bi-stable valve system 10a, and will be left on the work surface 65 and separated from the plies 42, such as the cut plies 42a, when the plies 42, such as the cut plies 42a are picked up by the automated bi-stable valve system 10, such as in the form of automated bi-stable valve system 10a.

FIG. 5I further shows the control system 84 with the traversable bridge apparatus 86 and the valve switch mechanism 88, in the form of the actuating control magnet assembly 92, showing the control magnet 105 within the traversable bridge apparatus 86. FIG. 5I further shows the control actuator 90 comprising the actuator 95, in the form of an electric solenoid 96, attached to, and housed within, the traversable bridge apparatus 86. As further shown in FIG. 5I, the plunger 184 of the electric solenoid 96, such as the push type tubular linear electric solenoid 96a, is coupled to the control magnet 105, and shows the control magnet 105 in the up position 108. FIG. 5I further shows the cylindrical body 178, the interior central channel 180, the coil 187, and the spring 188 of the control magnet/solenoid assembly 173. FIG. 5I further shows the power supply chain 168.

FIG. 5I further shows the one or more wiping magnets 116 attached to, and housed within the base portion 192, or lower portion, of the traversable bridge apparatus 86. As shown in FIG. 5I, the base portion 192, or lower portion, of the traversable bridge apparatus 86 is attached to the upper portion 194 of the traversable bridge apparatus 86, via the one or more attachment elements 195, such as one or more screws 195a, or other suitable attachment elements.

Now referring to FIG. 5J, FIG. 5J is an illustration of a top perspective view of plies 42, such as a cut plies 42a, to be picked up from a ply nest 62 on a work surface 65, using the automated bi-stable valve system 10, such as in the form of automated bi-stable valve system 10a, of FIG. 5I, and for example, can be positioned under the first set 78d (see FIG. 5I) and the second set 78e (see FIG. 5I) of bi-stable valves 78 in the valve closed state 80, having the first set 114a and the second set 114b of floating magnets 114 in the up position 237. FIG. 5J further shows portions 64a of waste material 64 adjacent the plies 42, such as the cut plies 42a, that can be positioned under the third set 78f (see FIG. 5I) and the fourth set 178g (see FIG. 5I) of bi-stable valves 78 in the valve open state 82, having the third set 114c and the fourth set 114d of floating magnets 114 in the down position 238.

Now referring to FIGS. 6A-6F, FIGS. 6A-6F show another version of components of the automated bi-stable valve system 10, such as in the form of automated bi-stable valve system 10b, where the valve switch mechanism 88 comprises at least one actuating compliant mechanism assembly 94. In this version of the automated bi-stable valve system 10b, the actuating control magnet assembly 92 of the automated bi-stable valve system 10a, is replaced with the actuating compliant mechanism assembly 94, and the bi-stable valves 78 with floating magnets 114 of the automated bi-stable valve system 10a are replaced with bi-stable valves 78 with a plurality of vacuum ports 132, and the control magnets 105 of the automated bi-stable valve system 10a are replaced with an actuator 95a (see FIG. 6E), or another suitable physical contact mechanism. In this version of the automated bi-stable valve system 10b, the actuating compliant mechanism assembly 94 provides a mechanical solution using a sliding connecting rod element 252 (see FIGS. 6B-6F) that is pushed and pulled to cover and uncover a vacuum port 132 (see FIG. 6D), discussed in further detail below.

Now referring to FIG. 6A, FIG. 6A is an illustration of a top schematic view of an exemplary version of an automated bi-stable valve system 10, such as in the form of an automated bi-stable valve system 10b, of the disclosure. FIG. 6A shows the automated bi-stable valve system 10, such as in the form of the automated bi-stable valve system 10b, comprising the bi-stable valve mechanism 76. As shown in FIG. 6A, the bi-stable valve mechanism 76 comprises a plurality of bi-stable valves 78, such as in the form of a plurality of vacuum ports 132. Each of the plurality of bi-stable valves 78, such as the vacuum ports 132, is configured to switch between the valve closed state 80 (see FIG. 1) and the valve open state 82 (see FIG. 1).

The automated bi-stable valve system 10, such as in the form of an automated bi-stable valve system 10b, further comprises a control system 84 (see FIG. 6A) coupled to the bi-stable valve mechanism 76 and configured to operably control the bi-stable valve mechanism 76. The control system 84 comprises a traversable bridge apparatus 86a (see FIG. 6A), coupled to the bi-stable valve mechanism 76, and a valve switch mechanism 88 (see FIGS. 1, 6B), such as in the form of an actuating compliant mechanism assembly 94 (see FIGS. 1, 6B), attached to the at least one traversable bridge apparatus 86a, and movable, via the at least one traversable bridge apparatus 86a, over the plurality of bi-stable valves 78, such as the plurality of vacuum ports 132. The valve switch mechanism 88 is configured to switch one or more of the plurality of bi-stable valves 78, such as the plurality of vacuum ports 132, between the valve closed state 80 and the valve open state 82, to allow for selective control of one or more adhesion zones 67 (see FIGS. 1, 4B) on the bi-stable valve mechanism 76, the one or more adhesion zones 67 corresponding to one or more adhesion areas 68 (see FIGS. 1, 4B) on a surface 70 (see FIGS. 1, 4B) of a material 40 (see FIGS. 1, 4B) to be selectively picked up and placed during a material handling process 16 (see FIG. 1). For example, during the material handling process 16 (see FIG. 1), a ply 42 (see FIG. 1), such as a cut ply 42a (see FIGS. 1, 4B), to be picked up, is positioned underneath the vacuum ports 132 that are in an open position 262 (see FIG. 1).

The automated bi-stable valve system 10, such as in the form of the automated bi-stable valve system 10b, is configured for attachment to an end effector 26 (see FIGS. 4A-4B) attached to a robot 22 (see FIG. 4A). The automated bi-stable valve system 10, such as in the form of the automated bi-stable valve system 10b, is a 1-to-many multiplexing valve system 14 (see FIG. 1). As further shown in FIG. 6A, the traversable bridge apparatus 86a is configured to traverse, or travel, across the bi-stable valve mechanism 76 in a first direction 150, such as a right-to left direction 150a, and in a second direction 154, such as a left to right direction 154a.

Figure 6C:
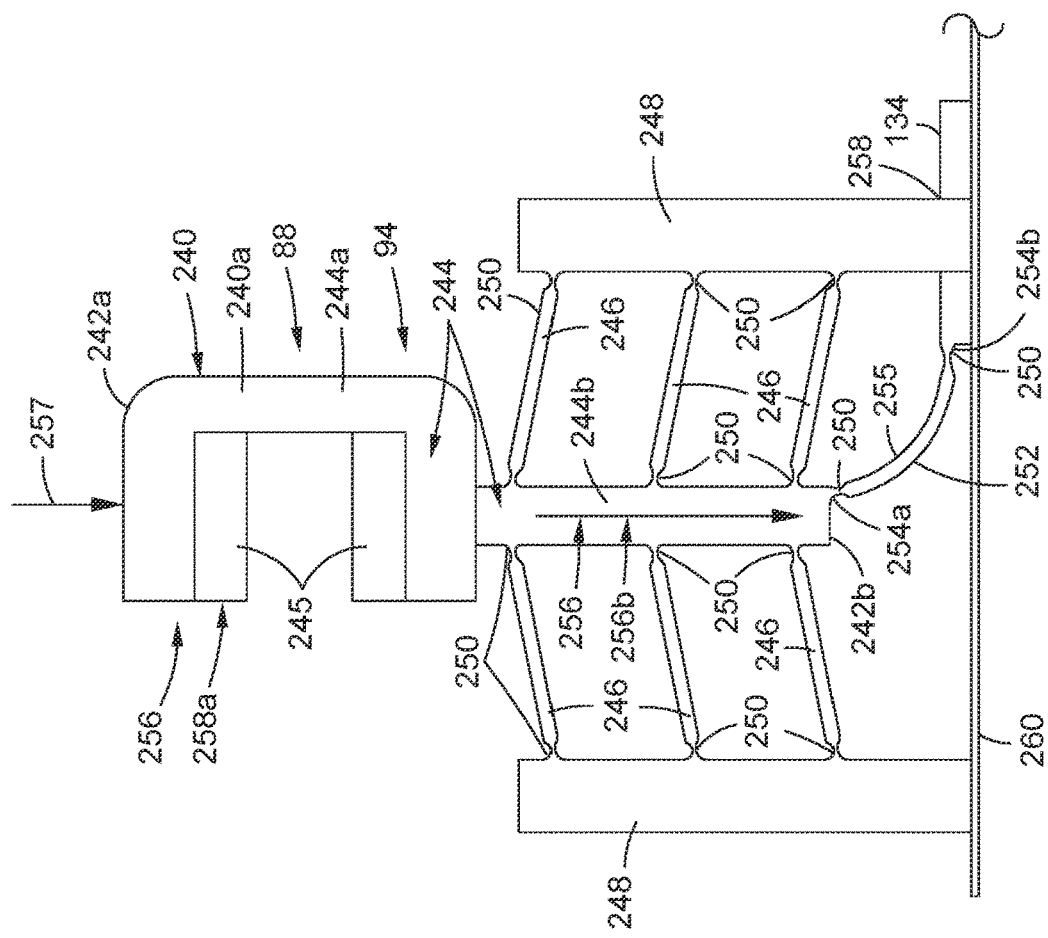
FIG. 6C is an illustration of a side view of the actuating compliant mechanism assembly of FIG. 6B.
Figure 6B:
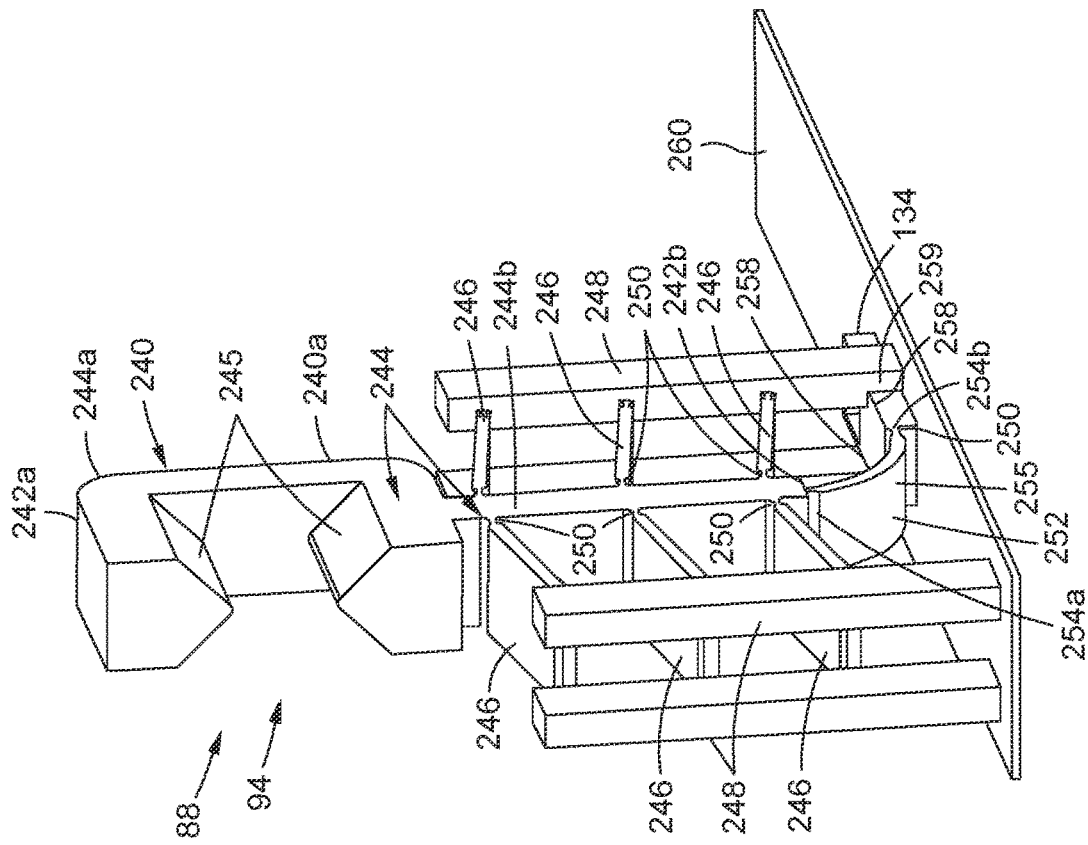
FIG. 6B is an illustration of a perspective back view of an actuating compliant mechanism assembly of the automated bi-stable valve system of FIG. 6A.
Figure 6D:
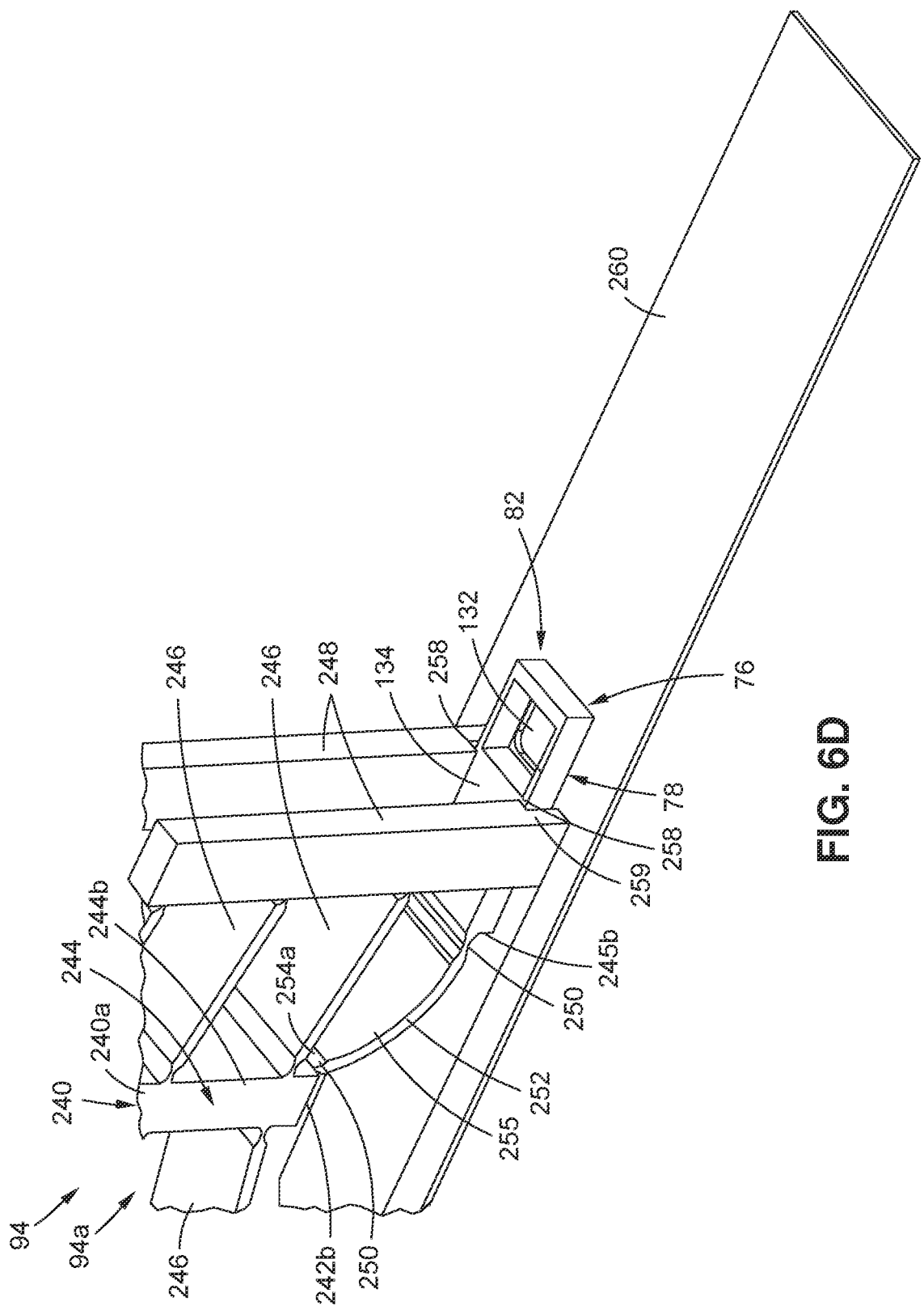
FIG. 6D is an illustration of a perspective top front view of a portion of the actuating compliant mechanism assembly of FIG. 6B.

Now referring to FIGS. 6B-6D, FIGS. 6B-6D are illustrations of a valve switch mechanism 88, such as in the form of an actuating compliant mechanism assembly 94, of the automated bi-stable valve system 10 (see FIG. 6A), such as the automated bi-stable valve system 10b (see FIG. 6A). FIG. 6B is an illustration of a perspective back view of the actuating compliant mechanism assembly 94 of the automated bi-stable valve system 10 (see FIG. 6A), such as the automated bi-stable valve system 10b (see FIG. 6A), of FIG. 6A. FIG. 6C is an illustration of a side view of the actuating compliant mechanism assembly 94 of FIG. 6B. FIG. 6D is an illustration of a perspective top front view of a portion 94a of the actuating compliant mechanism assembly 94 of FIG. 6B.

As shown in FIGS. 6B-6D, the actuating compliant mechanism assembly 94 comprises an actuating column structure 240, such as an actuating center column structure 240a, having a first end 242a and a second end 242b, and a body 244 formed between the first end 242a and the second end 242b. The actuating column structure 240 is preferably a rigid structure. In one exemplary version, the body 244 comprises a curved top portion 244a (see FIGS. 6B-6C) with a straight bottom portion 244b (see FIGS. 6B-6D) extending from the curved top portion 244a. The curved top portion 244a may be in the form of a C-shaped structure. The first end 242a of the actuating column structure 240 has cam surfaces 245 (see FIGS. 6B-6C) that, in one version, are configured to couple to, and couple to, a control actuator 90 (see FIGS. 1, 6E), such as an actuator 95a (see FIGS. 1, 6E). The actuator 95a may comprise a linear actuator 95b (see FIG. 1), a rotary actuator 95c (see FIGS. 1, 6E), or another suitable type of actuator. The actuator 95a may further comprise an electric actuator, a pneumatic actuator, or another suitable type of actuator. In one exemplary version, the actuator 95a is attached to the at least one traversable bridge apparatus 86a.

As shown in FIGS. 6B-6D, the actuating compliant mechanism assembly 94 further comprises a plurality of hinged beams 246 connected between the actuating column structure 240 and one or more fixed column structures 248. As shown in FIGS. 6B-6C, the fixed column structures 248 may comprise vertical shoulder beams, or another suitable structure, parallel to the straight bottom portion 244b of the body 244 of the actuating column structure 240. The fixed column structures 248 are preferably rigid in structure. FIG. 6B shows four fixed column structures 248 and one actuating column structure 240. In other versions, the actuating compliant mechanism assembly 94 may comprise less than four fixed column structures 248 or more than four fixed column structures 248, and may comprise more than one actuating column structure 240.

Each of the plurality of hinged beams 246 has compliant rotational hinged portions 250 (see FIG. 6C) at the ends of each hinged beam 246. The compliant rotational hinged portions 250 are thinned out portions where the material is thinner, narrower, and more compliant than the remaining portion of the hinged beam 246. The compliant rotational hinged portions 250 function as rotational hinges. The plurality of hinged beams 246 and the fixed column structures 248 and the actuating column structure 240 provide the actuating compliant mechanism assembly 94 with two equilibrium positions 256 (see FIG. 6C). As shown in FIG. 6C, the two equilibrium positions 256 include an up position 256a of the actuating column structure 240 and a down position 256b of the actuating column structure 240, where the actuating column structure 240 is moved downwardly from the up position 256a to the down position 256b, when a downward force 257 is applied to the first end 242a of the actuating column structure 240.

As shown in FIGS. 6B-6D, the actuating compliant mechanism assembly 94 further comprises a sliding connecting rod element 252 having a first end 254a, a second end 254b, and a curved body 255 formed between the first end 254a and the second end 254b. The first end 254a of the sliding connecting rod element 252 is coupled to, or connected to, the second end 242b of the actuating column structure 240. The second end 254b of the sliding connecting rod element 252 is coupled to, or connected to, a vacuum port cover 134 (see FIGS. 6B-6D). As shown in FIGS. 6B-6D, the sliding connecting rod element 252 has compliant rotational hinged portions 250 at the ends.

As shown in FIGS. 6B-6D, the actuating compliant mechanism assembly 94 further comprises a pair of guides 258, or notched portions, formed at a bottom end 259 (see FIGS. 6B, 6D) of two of the fixed column structures 248. The pair of guides 258 are configured to guide the vacuum port cover 134 over the vacuum port 132 between an open position 262 (see FIGS. 1, 6D) and a closed position 264 (see FIG. 1). FIGS. 6B-6D further show the actuating compliant mechanism assembly 94 coupled, or attached, to a base plate 260 through which the vacuum ports 132 are formed through. FIG. 6D further shows the bi-stable valve mechanism 76 with a bi-stable valves 78, such as in the form of a vacuum port 132.

Each actuating compliant mechanism assembly 94 may be made out of a metal material or a polymer material, such as a plastic material. If the actuating compliant mechanism assembly 94 is made of a metal material, the actuating compliant mechanism assembly 94 may be manufactured or formed using a three-dimensional (3D) printing process, such as a titanium three-dimensional (3D) printing process, or another suitable manufacturing process for metal materials. If the actuating compliant mechanism assembly 94 is made of a polymer material, the actuating compliant mechanism assembly 94 may be manufactured or formed using an injection molding process, or another suitable manufacturing process for polymer materials.

Figure 6E:
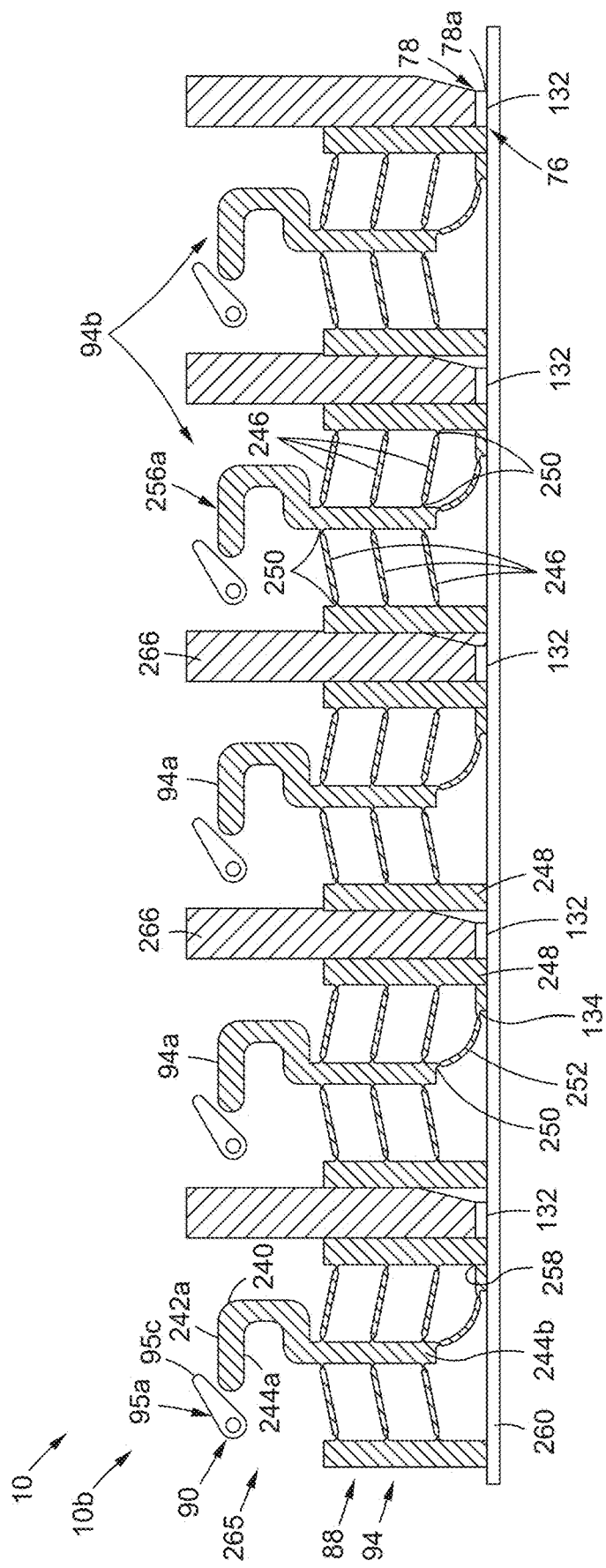
FIG. 6E is an illustration of a cross-sectional side view of an array of actuating compliant mechanism assemblies with rotary actuators.

Now referring to FIG. 6E, FIG. 6E is an illustration of a cross-sectional side view of an array 265 of valve switch mechanisms 88, such as actuating compliant mechanism assemblies 94, of the automated bi-stable valve system 10, such as in the form of automated bi-stable valve system 10b. FIG. 6E shows the valve switch mechanisms 88, such as the actuating compliant mechanism assemblies 94, with a plurality of control actuators 90, such as actuators 95a, in the form of rotary actuators 95c, configured to actuate the first end 242a of the actuating column structure 240. FIG. 6E further shows the bi-stable valve mechanism 76 with a row 78a of bi-stable valves 78, such as in the form of vacuum ports 132. The actuators 95a, such as the rotary actuators 95c, are configured to operably actuate the actuating column structures 240 of each of the actuating compliant mechanism assemblies 94 from the up position 256a (see FIG. 6E) to the down position 256b (see FIG. 6C), which, in turn, slides each of the sliding connecting rod elements 252, to push each vacuum port cover 134 (see FIG. 6E) of the plurality of vacuum port covers 134 over each vacuum port 132 (see FIG. 6E) of the plurality of vacuum ports 132, and to switch the bi-stable valves 78 comprising the vacuum ports 132, from the valve open state 82 to the valve closed state 80, and to switch the vacuum port covers 134 from the open position 262 (see FIGS. 1, 6D) to the closed position 264 (see FIG. 1). As the actuating column structure 240 is moved to the down position 256b, the sliding connecting rod element 252 effectively creates a sliding motion it converts a vertical motion into a horizontal motion to cover and uncover the vacuum port 132.

As shown in FIG. 6E, adjacent actuating compliant mechanism assemblies 94b are separated by a vacuum duct 266 that is coupled to, or adjacent to, fixed column structures 248 of each adjacent actuating compliant mechanism assembly 94b. The vacuum ducts 266 are configured for connection to the vacuum system 30 (see FIGS. 1, 4A). FIG. 6E further shows the actuating column structure 240 with the curved top portion 244a and the straight bottom portion 244b, the plurality of hinged beams 246 connected between the actuating column structure 240 and the fixed column structures 248, the compliant rotational hinged portions 250 of the hinged beams 246, the sliding connecting rod element 252 with compliant rotational hinged portions 250 at the ends, one of the pair of guides 258, and the base plate 260.

Figure 6F:
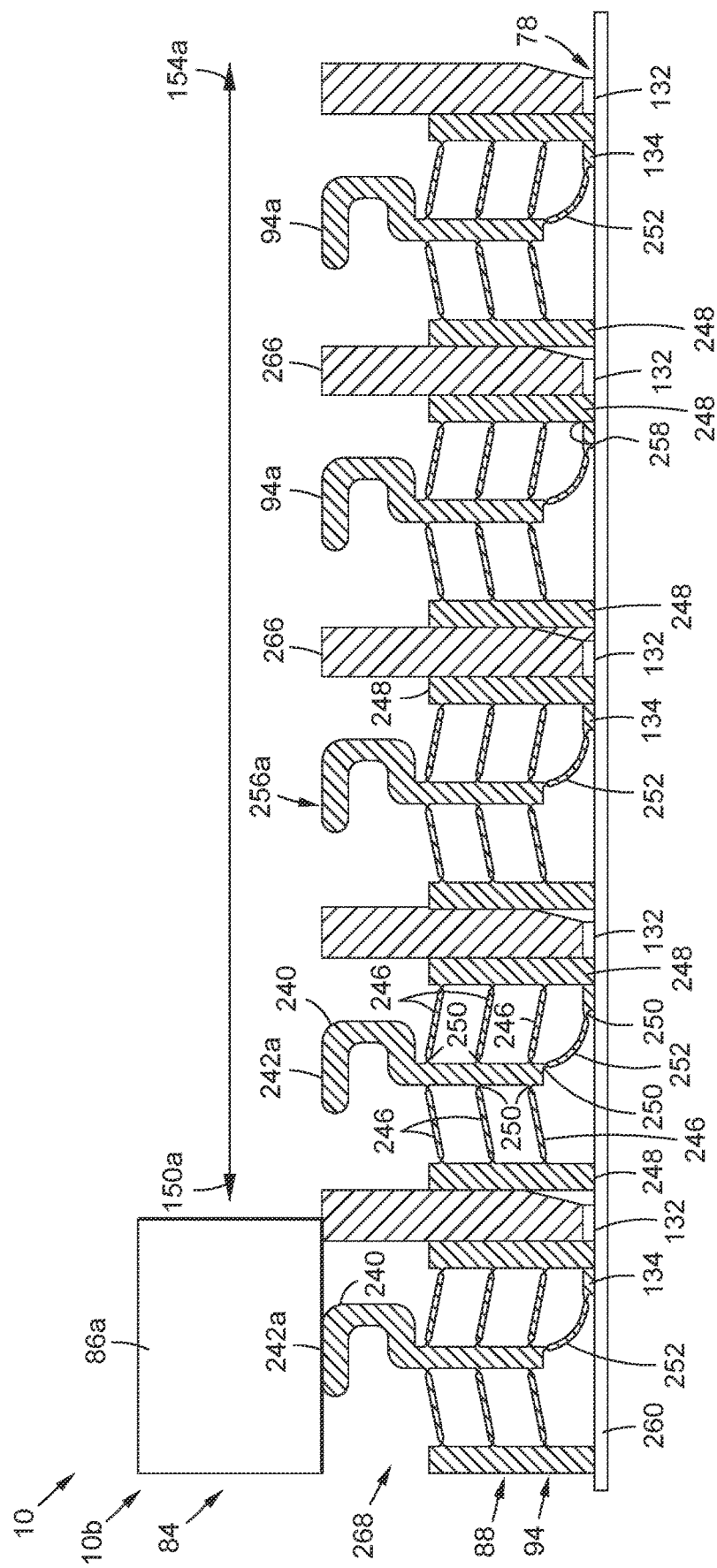
FIG. 6F is an illustration of a cross-sectional side view of an array of actuating compliant mechanism assemblies with a traversable bridge apparatus.

Now referring to FIG. 6F, FIG. 6F is an illustration of a cross-sectional side view of in the form of an array 268 of valve switch mechanisms 88, such as actuating compliant mechanism assemblies 94, of the automated bi-stable valve system 10, such as in the form of automated bi-stable valve system 10b. FIG. 6F shows the valve switch mechanisms 88, such as the actuating compliant mechanism assemblies 94, with the control system 84 comprising a traversable bridge apparatus 86a configured to traverse, or travel, over the actuating compliant mechanism assemblies 94, and over the plurality of bi-stable valves 78, such as the plurality of vacuum ports 132. The traversable bridge apparatus 86a is configured to traverse or travel, and traverses or travels, across the first ends 242a of the actuating column structures 240, to actuate the actuating column structures 240 of the actuating compliant mechanism assemblies 94 from the up position 256a (see FIG. 6F) to the down position 256b (see FIG. 6C), which, in turn, slides each of the sliding connecting rod elements 252, to push each vacuum port cover 134 (see FIG. 6F) of the plurality of vacuum port covers 134 over each vacuum port 132 (see FIG. 6F) of the plurality of vacuum ports 132, and to switch the bi-stable valves 78 comprising the vacuum ports 132, from the valve open state 82 to the valve closed state 80, and to switch the vacuum port covers 134 from the open position 262 (see FIGS. 1, 6D) to the closed position 264 (see FIG. 1). The traversable bridge apparatus 86a traverses, or travels, across the actuating compliant mechanism assemblies 94 and sets the positions of the vacuum ports 132. As further shown in FIG. 6F, the traversable bridge apparatus 86a is configured to traverse, or travel, across the adjacent actuating compliant mechanism assemblies 94b in a right-to left direction 150a or a left to right direction 154a.

FIG. 6F further shows the plurality of hinged beams 246 connected between the actuating column structure 240 and the fixed column structures 248, the compliant rotational hinged portions 250 of the hinged beams 246, the sliding connecting rod element 252 with compliant rotational hinged portions 250 at the ends, one of the pair of guides 258, and the base plate 260. FIG. 6F further shows adjacent actuating compliant mechanism assemblies 94b separated by the vacuum duct 266 that is coupled to, or adjacent to, fixed column structures 248 of each adjacent actuating compliant mechanism assembly 94b. The vacuum ducts 266 are configured for connection to the vacuum system 30 (see FIGS. 1, 4A).

Figure 7:
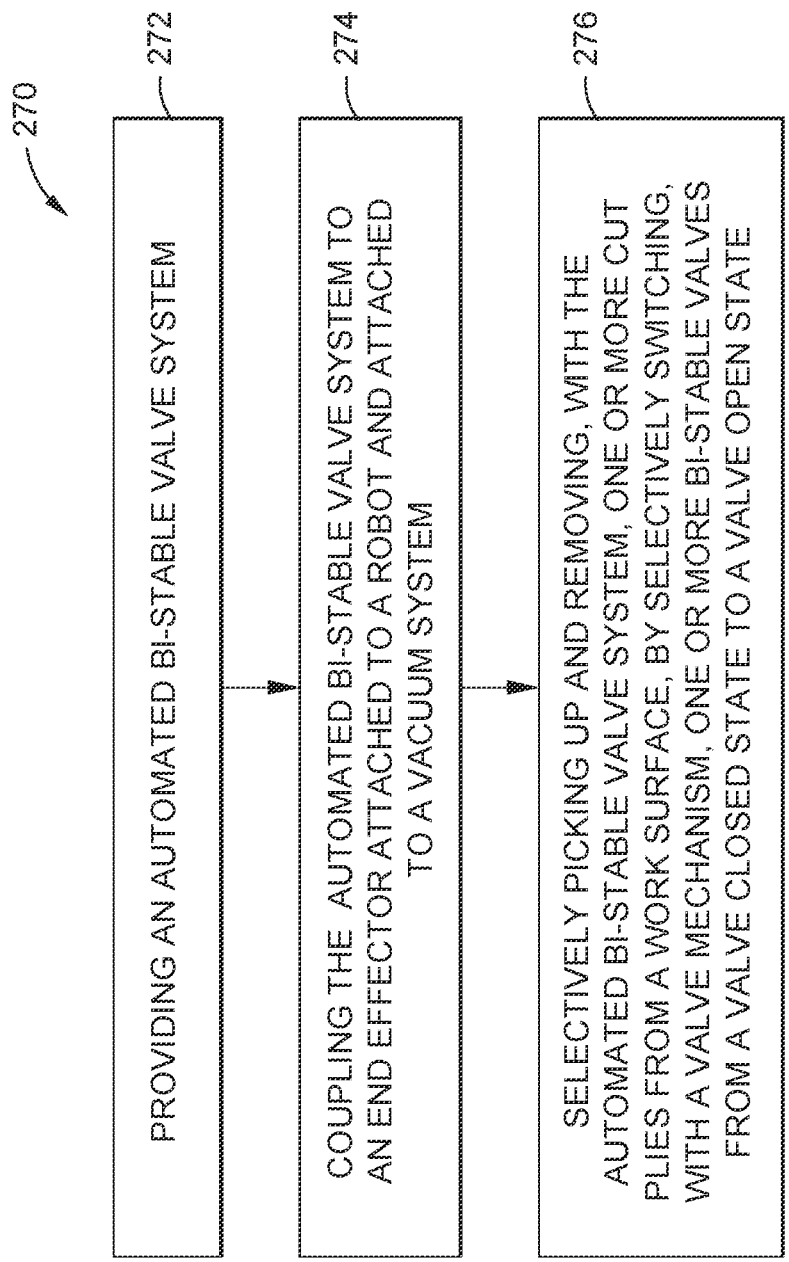
FIG. 7 is an illustration of a flow diagram of an exemplary version of a method of the disclosure.

Now referring to FIG. 7, FIG. 7 is an illustration of a flow diagram of an exemplary version of a method 270 of the disclosure. In another version of the disclosure, there is provided the method 270 of using an automated bi-stable valve system 10 (see FIG. 1) in a material handling process 16 (see FIG. 1) for composite manufacturing (see FIG. 1).

The blocks in FIG. 7 represent operations and/or portions thereof, or elements, and lines connecting the various blocks do not imply any particular order or dependency of the operations or portions thereof, or elements. FIG. 7 and the disclosure of the steps of the method 270 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 7, the method 270 comprises step 272 of providing an automated bi-stable valve system 10. As discussed above, the automated bi-stable valve system 10 comprises a bi-stable valve mechanism 76 (see FIG. 1) comprising a plurality of bi-stable valves 78 (see FIG. 1). Each of the plurality of bi-stable valves 78 is configured to switch between a valve closed state 80 (see FIG. 1) and a valve open state 82 (see FIG. 1). The automated bi-stable valve system 10 further comprises a control system 84 (see FIG. 1) coupled to the bi-stable valve mechanism 76 and configured to operably control the bi-stable valve mechanism 76.

The control system 84 comprises at least one traversable bridge apparatus 86 (see FIG. 1). The control system 84 further comprises a valve switch mechanism 88 (see FIG. 1) attached to the at least one traversable bridge apparatus 86, and movable, via the at least one traversable bridge apparatus 86, over the plurality of bi-stable valves 78. The valve switch mechanism 88 comprises a plurality of control actuators 90 (see FIG. 1). In one version, the plurality of bi-stable valves 78 comprises a plurality of rows 78a (see FIG. 5C) of bi-stable valves 78, and each control actuator 90 of the plurality of control actuators 90 is configured to actuate one or more different rows 78b of the plurality of rows 78a of bi-stable valves 78.

The step 272 of providing the automated bi-stable valve system 10 may further comprise providing the automated bi-stable valve system 10, wherein each of the plurality of bi-stable valves 78 of the bi-stable valve mechanism 76 further comprises a non-ferrous sleeve 218 (see FIGS. 5G-5H) having a first ferrous element 222 (see FIGS. 5G-5H), such as a first ferrous plate 222a (see FIGS. 5G-5H), for example, an upper ferrous plate, and a second ferrous element 225 (see FIGS. 5G-5H), such as a second ferrous plate 225a (see FIGS. 5G-5H), for example, a lower ferrous plate, and a seal 228 (see FIGS. 5G-5H) adjacent to the first ferrous element 222. The first ferrous element 222 has an opening 224 (see FIGS. 5G-5H), and the second ferrous element 225 has an opening 226 (see FIGS. 5G-5H). The seal 228 has an opening 230 (see FIGS. 5G-5H). Each of the plurality of bi-stable valves 78 further comprises a floating magnet 114 (see FIG. 1) within the non-ferrous sleeve 218 and movable between the first ferrous element 222, to block the opening 230 of the seal 228 and the opening 224 of the second ferrous element 225, and to cause the bi-stable valve 78 to be in the valve closed state 80 (see FIG. 1), and the second ferrous element 225, to unblock the opening 230 of the seal 228 and the opening 224 of the first ferrous element 222, and to cause the bi-stable valve 78 to be in the valve open state 82 (see FIG. 1). Each of the plurality of bi-stable valves 78 further comprises a magnetic shielding 235 (see FIGS. 5G-5H) around each of the plurality of bi-stable valves 78 to limit magnetic interference of adjacent bi-stable valves 78c.

The step 272 of providing the automated bi-stable valve system 10 may further comprise providing the automated bi-stable valve system 10, wherein the valve switch mechanism 88 comprises, in one version, at least one actuating control magnet assembly 92 (see FIGS. 1, 5A-5I). With the actuating control magnet assembly 92, the control actuator 90 comprises an actuator 95 (see FIG. 1) attached to the at least one traversable bridge apparatus 86. As shown in FIG. 1, the actuator 95 comprises one of, an electric solenoid 96, a pneumatic solenoid 98, an electric motor 100, or another suitable actuator. The electric motor 100 may comprise a servo motor 102 (see FIG. 1), a stepper motor 104 (see FIG. 1), or another suitable electric motor.

The actuating control magnet assembly 92 further comprises a control magnet 105 (see FIG. 1) coupled to the actuator 95. The control magnet 105 has a control magnet (CM) polarity 106 (see FIG. 1). The actuator 95 is configured to operably actuate the control magnet 105 between an up position 108 (see FIG. 1) and a down position 110 (see FIG. 1). The control magnet 105 has a strength 107 (see FIG. 1) sufficient to overcome coupling of each floating magnet 114 and its associated first ferrous element 222. The control magnet 105 is configured to impart, and imparts, a magnetic force 112 (see FIG. 1) on the floating magnet 114 of each bi-stable valve 78, to push the floating magnet 114 down, to switch the bi-stable valve 78 between the valve closed state 80 and the valve open state 82. Each floating magnet 114 has a floating magnet (FM) polarity 115 (see FIG. 1).

The step 272 of providing the automated bi-stable valve system 10 may further comprise providing the automated bi-stable valve system 10, wherein the valve switch mechanism 88, in the form of the actuating control magnet assembly 92, may further optionally comprise one or more wiping magnets 116 (see FIG. 1) attached to the at least one traversable bridge apparatus 86, and movable over the plurality of bi-stable valves 78. The one or more wiping magnets 116 are configured to reset one or more of the plurality of bi-stable valves 78 to be in the valve closed state 80 or the valve open state 82, prior to the control magnet 105 moving over the plurality of bi-stable valves 78, to selectively switch one or more of the plurality of bi-stable valves 78 between the valve closed state 80 and the valve open state 82.

Alternatively, instead of including one or more wiping magnets 116, the valve switch mechanism 88, in the form of the actuating control magnet assembly 92, may further optionally include or comprise one of, as shown in FIG. 1, an electromagnet 120, a solenoid-mounted control magnet 122 with a polarity 124 that is opposite the control magnet polarity 106 of the control magnet 105 and with a polarity 124 that is the same as the wiping magnet polarity 118 of the wiping magnet 116, a mechanism 125 to move a magnetic pole 126, a mechanism 128 to block or decrease a magnetic strength 130, or another suitable mechanism.

The step 272 of providing the automated bi-stable valve system 10 may further comprise providing the automated bi-stable valve system 10, wherein the valve switch mechanism 88 comprises, in another version, at least one actuating compliant mechanism assembly 94 (see FIGS. 1, 6A-6F). With the actuating compliant mechanism assembly 94, the control actuator 90 comprises an actuator 95a (see FIG. 1) comprising a linear actuator 95b, a rotary actuator 95c, or another suitable actuator. The actuator 95a may further comprise an electric actuator, a pneumatic actuator, or another suitable type of actuator. In one exemplary version, the actuator 95a is attached to one of the at least one traversable bridge apparatuses 86

The step 272 of providing the automated bi-stable valve system 10 may further comprise providing the automated bi-stable valve system 10, wherein with the at least one actuating compliant mechanism assembly 94, each of the plurality of bi-stable valves 78 of the bi-stable valve mechanism 76 comprises a plurality of vacuum ports 132 (see FIGS. 6D-6F) with a plurality of vacuum port covers 134 (see FIGS. 6D-6F) configured to open and close between the valve closed state 80 and the valve open state 82, for example, the open position 262 (see FIGS. 1, 6D) and the closed position 264 (see FIG. 1) of the vacuum ports 132.

In one exemplary version, the at least one actuating compliant mechanism assembly 94 comprises an actuator 95a (see FIG. 1) attached to one of the at least one traversable bridge apparatuses 86a (see FIGS. 6A, 6F). The actuating compliant mechanism assembly 94 comprises the actuating column structure 240 (see FIGS. 6B-6D) coupled to the actuator 95a. The actuating column structure 240 has a first end 242a (see FIG. 6B) and a second end 242b (see FIG. 6B), and a body 244 (see FIG. 6B) formed between the first end 242a and the second end 242b. The actuating column structure 240 is preferably a rigid structure.

The actuating compliant mechanism assembly 94 further comprises a plurality of hinged beams 246 (see FIGS. 6B-6D) connected between the actuating column structure 240 and one or more fixed column structures 248 (see FIGS. 6B-6D). The fixed column structures 248 are preferably rigid in structure. Each of the plurality of hinged beams 246 has compliant rotational hinged portions 250 (see FIGS. 6B-6D) at the ends of each hinged beam 246. The compliant rotational hinged portions 250 function as rotational hinges. The plurality of hinged beams 246 and the actuating column structure 240 provide the actuating compliant mechanism assembly 94 with two equilibrium positions 256 (see FIG. 6C). As shown in FIG. 6C, the two equilibrium positions 256 include an up position 256a of the actuating column structure 240 and a down position 256b of the actuating column structure 240, where the actuating column structure 240 is moved downwardly from the up position 256a to the down position 256b, when the downward force 257 is applied to the first end 242a of the actuating column structure 240.

The actuating compliant mechanism assembly 94 further comprises a sliding connecting rod element 252 (see FIGS. 6B-6D) having a first end 254a (see FIG. 6C), a second end 254b (see FIG. 6C), and a curved body 255 (see FIG. 6C) formed between the first end 254a and the second end 254b. The first end 254a of the sliding connecting rod element 252 is coupled to, or connected to, the second end 242b of the actuating column structure 240. The second end 254b of the sliding connecting rod element 252 is coupled to, or connected to, the vacuum port cover 134 (see FIGS. 6B-6D). As shown in FIGS. 6B-6D, the sliding connecting rod element 252 has compliant rotational hinged portions 250 at the ends. The actuating compliant mechanism assembly 94 further comprises a pair of guides 258 (see FIGS. 6B-6D) are configured to guide the vacuum port cover 134 between the open position 262 (see FIGS. 1, 6D) and the closed position 264 (see FIG. 1). The actuating compliant mechanism assembly 94 further comprises a base plate 260 (see FIGS. 6B-6D).

The actuator 95a is configured to operably actuate the actuating column structure 240 in a down position 256b (see FIG. 6C), which, in turn, slides the sliding connecting rod element 252, to push a vacuum port cover 134 (see FIG. 6D) of the plurality of vacuum port covers 134 over a vacuum port 132 (see FIG. 6D) of the plurality of vacuum ports 132, and to switch the bi-stable valve 78 comprising the vacuum port 132 from the valve open state 82 to the valve closed state 80, and to switch the vacuum port cover 134 from the open position 262 (see FIG. 6D) to the closed position 264 (see FIG. 1). Thus, the vacuum port cover 134 is driven, such as pushed and pulled, by the actuation up and down of the sliding connecting rod element 252.

As shown in FIG. 7, the method 270 further comprises step 274 of coupling the automated bi-stable valve system 10 to an end effector 26 (see FIG. 1) attached to a robot 22 (see FIG. 1) and attached to a vacuum system 30 (see FIG. 1). The automated material handling system 12 including the automated bi-stable valve system 10, comprises the robot 22, such as in the form of a pick-and-place operations robot 22a (see FIG. 1), or another suitable robot, having an arm 24 (see FIG. 4A) with the end effector 26 (see FIGS. 4A-4B), configured to hold the automated bi-stable valve system 10. The automated material handling system 12 (see FIG. 1) further comprises the vacuum system 30 (see FIGS. 1, 4A) having a portion coupled to the end effector 26, or another suitable part of the robot 22, and having a portion coupled to the automated bi-stable valve system 10. The vacuum system 30 comprises a vacuum manifold 32 (see FIG. 4A), one or more vacuum lines 34 (see FIG. 4A), a vacuum source 35 (see FIG. 4A), and a vacuum power supply 36 (see FIG. 4A). The vacuum source 35 may comprise a vacuum generator 35a (see FIG. 4A), a blower, or another suitable vacuum source, configured to pull air 38 (see FIG. 1) in an air flow 38a (see FIGS. 1, 5H), or vacuum flow, through the one or more vacuum lines 34, the vacuum manifold 32, and the automated bi-stable valve system 10. The vacuum system 30 may further comprise one or more control valves, shutoff valves, and/or other suitable vacuum system components.

As shown in FIG. 7, the method 270 further comprises step 276 of selectively picking up and removing, with the automated bi-stable valve system 10, one or more plies 42 (see FIGS. 1, 4B), such as one or more cut plies 42a (see FIGS. 1, 4B), from a work surface 65 (see FIG. 4A), by selectively switching, with the valve switch mechanism 88, one or more of the plurality of bi-stable valves 78 from the valve closed state 80 to the valve open state 82, to allow for selective control of one or more adhesion zones 67 (see FIGS. 1, 4B) on the bi-stable valve mechanism 76, the one or more adhesion zones 67 corresponding to one or more adhesion areas 68 (see FIGS. 1, 4B) on a surface 70 (see FIGS. 1, 4B) of the one or more plies 42, such as the one or more cut plies 42a, and to increase valve densities 136 (see FIG. 1).

Figure 8:
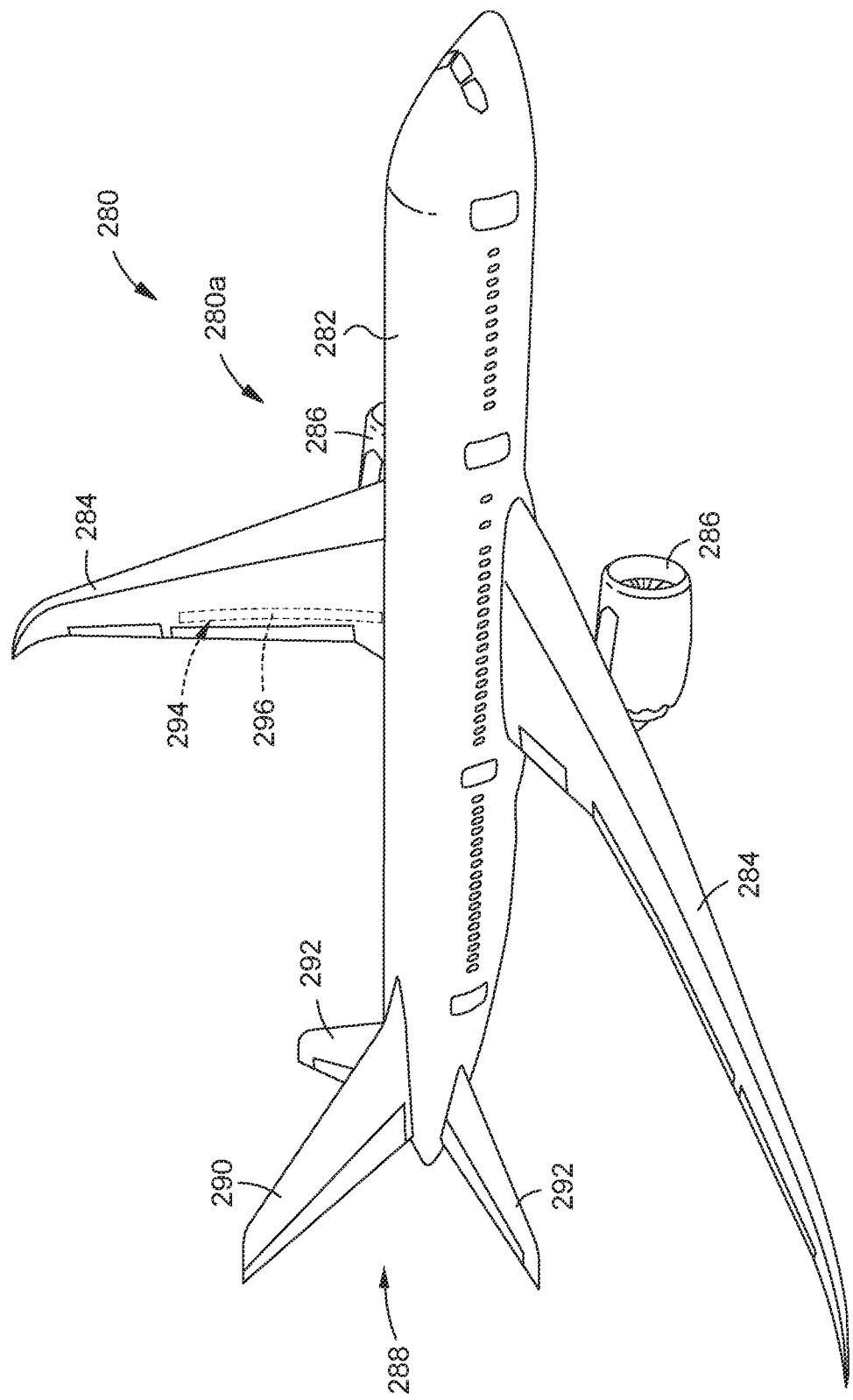
FIG. 8 is an illustration of a perspective view of an aircraft incorporating an aircraft part made with an exemplary version of an automated material handling system with an exemplary version of an automated bi-stable valve system of the disclosure.

Now referring to FIG. 8, FIG. 8 is an illustration of a perspective view of a vehicle 280, such as an aircraft 280a, incorporating a composite part 294, such as in the form of an aircraft composite part 296, for example, a wing spar, made with a version of the automated material handling system 12 using a version of the automated bi-stable valve system 10 disclosed herein. As shown in FIG. 8, the vehicle 280, such as the aircraft 280a, includes a fuselage 282, wings 284, engines 286, and an empennage 288. As shown in FIG. 8, the empennage 288 comprises a vertical stabilizer 290 and horizontal stabilizers 292. The composite parts 294 formed using the automated material handling system 12 with the automated bi-stable valve system 10 may be used in a variety of industries and applications including, but not limited to, in connection with the manufacture of aircraft 280a and other aerospace structures and vehicles, including spacecraft, and rotorcraft, as well as vehicles such as watercraft, trains, or other suitable vehicles or structures.

Figure 9:
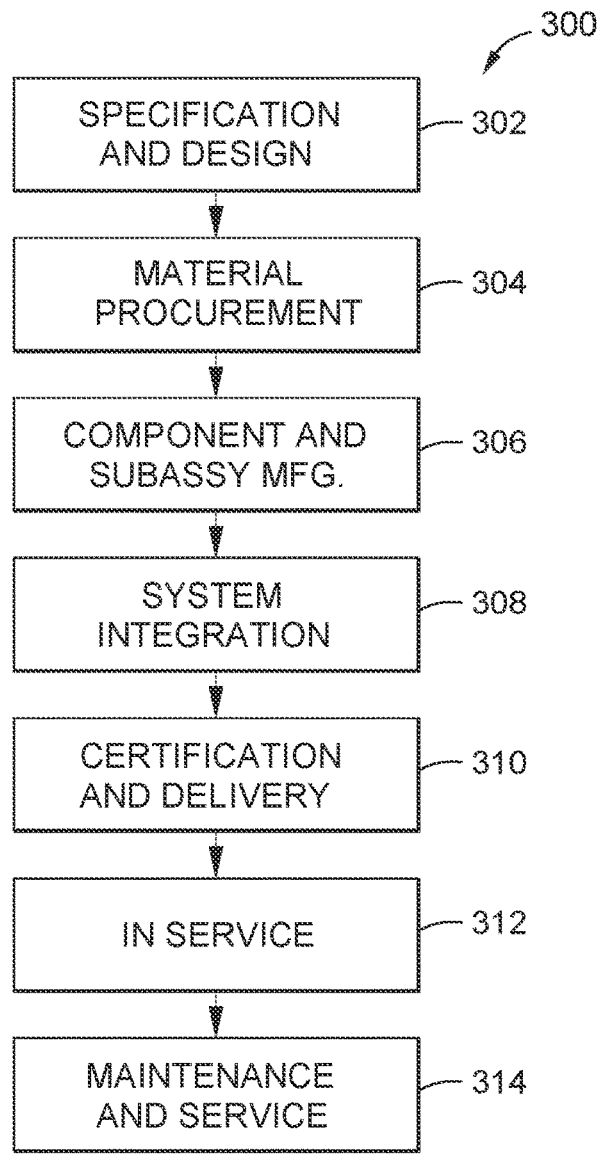
FIG. 9 is an illustration of a flow diagram of an exemplary aircraft manufacturing and service method.
Figure 10:
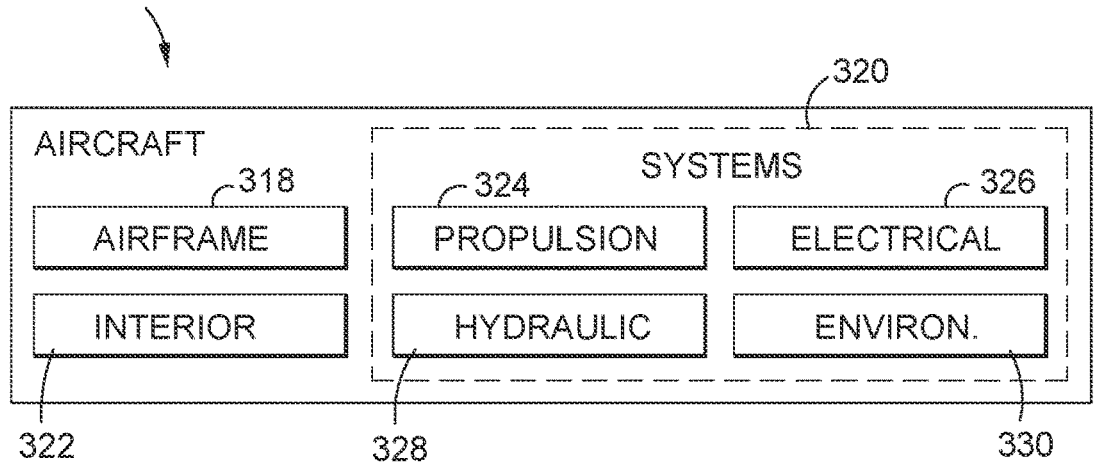
FIG. 10 is an illustration of an exemplary block diagram of an aircraft.

Now referring to FIGS. 9 and 10, FIG. 9 is an illustration of a flow diagram of an exemplary aircraft manufacturing and service method 300, and FIG. 10 is an illustration of an exemplary block diagram of an aircraft 316. Referring to FIGS. 9 and 10, versions of the disclosure may be described in the context of the aircraft manufacturing and service method 300 as shown in FIG. 9, and the aircraft 316 as shown in FIG. 10.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the automated bi-stable valve system 10 (see FIGS. 1, 5A-5I, FIGS. 6A-6F), the automated material handling system 12 (see FIGS. 1, 4A), and the method 270 (see FIG. 7) provide for a 1-to-many multiplexing valve system 14 (see FIG. 1) using one control system 84 (see FIG. 1), or control mechanism, to control multiple bi-stable valves 78 (see FIG. 1), and splitting the control system 84 away from the individual bi-stable valves 78, to enable significantly higher valve densities 136 (see FIG. 1), and to reduce the size and mass, as compared to known valve systems and methods, while enabling a more scalable solution. Disclosed versions of the automated bi-stable valve system 10 (see FIGS. 1, 5A-5I, FIGS. 6A-6F), the automated material handling system 12 (see FIGS. 1, 4A), and the method 270 (see FIG. 7) provide for a much denser solution of bi-stable valves 78 by embedding the bi-stable valves 78 next to each other with common parts, like a common channel 232 (see FIGS. 5G-5H) and a common vacuum manifold 32 (see FIG. 4A), and not using bulky and heavy known valve blocks and valves.

With higher valve densities 136, adhesion of the automated bi-stable valve system 10 to the plies 42 (see FIG. 1), such as the cut plies 42a (see FIG. 1), is easier to control. The closer the adhesion is to the edges 66 (see FIG. 1) of the plies 42, such as the cut plies 42a, the less chance there is of disturbing the waste material 64, or skeleton material, that is not to be picked up and that is adjacent to the plies 42, such as the cut plies 42a. Versions of the automated bi-stable valve system 10 provide for highly pixelated, discrete control for ply adhesion 74 (see FIG. 1), and can facilitate composite structure layup, for example, high rate wing spar layup, by allowing for handling of nested unidirectional carbon fiber 50b (see FIG. 1) having different shapes, sizes, and/or orientations. The bi-stable state of the bi-stable valves 78 is either allowing air flow 38a (see FIG. 5H), or vacuum flow, or blocking or denying air flow 38a, or vacuum flow.

In addition, disclosed versions of the automated bi-stable valve system 10 (see FIGS. 1, 5A-5I, FIGS. 6A-6F), the automated material handling system 12 (see FIGS. 1, 4A), and the method 270 (see FIG. 7) provide a valve switch mechanism 88 (see FIG. 1) comprising, in one version, an actuating control magnet assembly 92 (see FIGS. 1, 5A-5I), and in another version, an actuating compliant mechanism assembly 94 (see FIGS. 1, 6A-6F). Versions of both of the actuating control magnet assembly 92 and the actuating compliant mechanism assembly 94 use the traversable bridge apparatus 86 that traverses, or travels over the rows 78a of bi-stable valves 78 to selectively set the valve closed state 80 or the valve open state 82 of each bi-stable valve 78. The bi-stable valve 78 are selectively switched on and off without having to use a bulky and heavy valve block.

With the actuating control magnet assembly 92, one or more control magnets 105, one or more floating magnets 114, and optionally, one or more wiping magnets 116, are used for both a bi-stable state and a control of valve state. In an example implementation, the control magnet 105 is realized as a permanent magnet actuated via an actuator 95, such as an electric solenoid 96 (see FIG. 5D), or another suitable actuator. However, the control magnet polarity 106 (see FIG. 1) or relative position of the control magnet 105 to the bi-stable valve 78 may be changed in other suitable ways. The bi-stable valves 78 comprise floating magnets 114 that can move inside a non-ferrous sleeve 218 (see FIGS. 5G-5H), and comprise a magnetic shielding 235 (see FIGS. 5G-5H), or ferrous shielding, around each of the bi-stable valves 78, to limit magnetic interference of adjacent bi-stable valves 78c (see FIGS. 5G-5H). Balancing the magnetic force 112 (see FIG. 1) by controlling the magnetic or ferrous material, the gap areas 236 (see FIGS. 5G-5H), and the magnetic strength 130 of the magnets, is required to ensure bi-stable valves 78 that are reliable and that are able to be switch between a valve closed state 80 (see FIG. 1) and a valve open state 82 (see FIG. 1).

With the actuating compliant mechanism assembly 94, the bi-stable valves 78 with floating magnets 114 of the automated bi-stable valve system 10a are replaced with bi-stable valves 78 with a plurality of vacuum ports 132 (see FIG. 6A), and the control magnets 105 of the automated bi-stable valve system 10a are replaced with (see FIG. 6E) an actuator 95a (see FIG. 6E), or another suitable physical contact mechanism. In this version of the automated bi-stable valve system 10b, the actuating compliant mechanism assembly 94 provides a mechanical solution using a sliding connecting rod element 252 (see FIGS. 6B-6F) that is pushed and pulled to cover and uncover a vacuum port 132 (see FIG. 6D), as discussed in detail above.

Further, the disclosure comprises embodiments according to the following clauses:

Clause 1. An automated bi-stable valve system comprising:
a bi-stable valve mechanism comprising a plurality of bi-stable valves, wherein each of the plurality of bi-stable valves is configured to switch between a valve closed state and a valve open state; and
a control system coupled to the bi-stable valve mechanism and configured to operably control the bi-stable valve mechanism, the control system comprising:
(i) at least one traversable bridge apparatus; and
(ii) a valve switch mechanism attached to the at least one traversable bridge apparatus, and movable, via the at least one traversable bridge apparatus, over the plurality of bi-stable valves,
wherein the valve switch mechanism is configured to switch one or more of the plurality of bi-stable valves between the valve closed state and the valve open state, to allow for selective control of one or more adhesion zones on the bi-stable valve mechanism, the one or more adhesion zones corresponding to one or more adhesion areas on a surface of a material to be selectively picked up and placed during a material handling process.

Clause 2. The automated bi-stable valve system of Clause 1, wherein the automated bi-stable valve system is configured for attachment to an end effector attached to a robot.

Clause 3. The automated bi-stable valve system of Clause 1 or Clause 2, wherein the automated bi-stable valve system is a 1-to-many multiplexing valve system.

Clause 4. The automated bi-stable valve system of any of Clauses 1 to 3, wherein the valve switch mechanism comprises a plurality of control actuators, wherein the plurality of bi-stable valves comprises a plurality of rows of bi-stable valves, and wherein each control actuator of the plurality of control actuators is configured to actuate one or more different rows of the plurality of rows of bi-stable valves.

Clause 5. The automated bi-stable valve system of any of Clauses 1 to 4, wherein each of the plurality of bi-stable valves of the bi-stable valve mechanism comprises:
a non-ferrous sleeve having a first ferrous element and a second ferrous element;
a seal adjacent to the first ferrous element, the seal having an opening; and
a floating magnet within the non-ferrous sleeve and movable between,
(i) the first ferrous element, to block the opening and to cause the bi-stable valve to be in the valve closed state, and
(ii) the second ferrous element, to unblock the opening and to cause the bi-stable valve be in the valve open state.

Clause 6. The automated bi-stable valve system of Clause 5, wherein each of the plurality of bi-stable valves further comprises:
a magnetic shielding around each of the plurality of bi-stable valves to limit magnetic interference of adjacent bi-stable valves.

Clause 7. The automated bi-stable valve system of any of Clauses 5 to 6, wherein the valve switch mechanism comprises:
at least one actuating control magnet assembly comprising:
(i) an actuator attached to the at least one traversable bridge apparatus; and
(ii) a control magnet coupled to the actuator and having a strength sufficient to overcome coupling of each floating magnet and its associated first ferrous element,
wherein the actuator is configured to operably actuate the control magnet between an up position and a down position, and the control magnet is configured to impart a magnetic force on the floating magnet, to push the floating magnet down, to switch the bi-stable valve between the valve closed state and the valve open state.

Clause 8. The automated bi-stable valve system of Clause 7, wherein the actuator comprises one of, an electric solenoid, a pneumatic solenoid, or an electric motor.

Clause 9. The automated bi-stable valve system of any of Clauses 7 to 8, wherein the valve switch mechanism further comprises:
one or more wiping magnets attached to the at least one traversable bridge apparatus and movable over the plurality of bi-stable valves, wherein the one or more wiping magnets are configured to reset one or more of the plurality of bi-stable valves to be in the valve closed state or the valve open state, prior to the control magnet moving over the plurality of bi-stable valves to selectively switch one or more of the plurality of bi-stable valves between the valve closed state and the valve open state.

Clause 10. The automated bi-stable valve system of any of Clauses 7 to 8, wherein the valve switch mechanism further comprises:
one of, an electromagnet, a solenoid-mounted control magnet with a polarity that is opposite the control magnet, a mechanism to move a magnetic pole, or a mechanism to block or decrease a magnetic strength.

Clause 11. The automated bi-stable valve system of any of Clauses 1 to 4, wherein each of the plurality of bi-stable valves of the bi-stable valve mechanism comprises a plurality of vacuum ports with a plurality of vacuum port covers configured to open and close between the valve closed state and the valve open state.

Clause 12. The automated bi-stable valve system of any of Clauses 1 to 4 and 11, wherein the valve switch mechanism comprises:
at least one actuating compliant mechanism assembly comprising:
(i) an actuator attached to the at least one traversable bridge apparatus;
(ii) an actuating column structure coupled to the actuator;
(iii) a plurality of hinged beams connected between the actuating column structure and one or more fixed column structures, each of the plurality of hinged beams having compliant rotational hinged portions;
(iv) a sliding connecting rod element connected at a first end to the actuating column structure, and connected at a second end to one of the plurality of vacuum port covers, the sliding connecting rod element having compliant rotational hinged portions; and
(v) a pair of guides coupled to a base of the at least one actuating compliant mechanism assembly, the pair of guides configured to guide the vacuum port cover,
wherein the actuator is configured to operably actuate the actuating column structure in a down position, which, in turn, slides the sliding connecting rod element, to push the vacuum port cover over the vacuum port, and to switch the bi-stable valve from the valve open state to the valve closed state.

Clause 13. The automated bi-stable valve system of any of Clauses 1 to 4 and 11 to 12, wherein the actuator comprises one of, a linear actuator, or a rotary actuator.

Clause 14. The automated bi-stable valve system of any of Clauses 1 to 13, wherein the material to be picked up and placed during the material handling process comprises one or more plies comprised of unidirectional fiber material.

Clause 15. An automated material handling system for a material handling process in composite manufacturing, the automated material handling system comprising:
one or more cut plies to be selectively picked up and removed from a work surface;
a robot having an arm with an end effector;
a vacuum system coupled to the end effector; and
an automated bi-stable valve system coupled to a first end of the end effector, the automated bi-stable valve system comprising:
(a) a bi-stable valve mechanism comprising a plurality of bi-stable valves, wherein each of the plurality of bi-stable valves is configured to switch between a valve closed state and a valve open state; and
(b) a control system coupled to the bi-stable valve mechanism and configured to operably control the bi-stable valve mechanism, the control system comprising:
(i) at least one traversable bridge apparatus; and
(ii) a valve switch mechanism attached to the at least one traversable bridge apparatus, and movable, via the at least one traversable bridge apparatus, over the plurality of bi-stable valves,
wherein the valve switch mechanism is configured to switch one or more of the plurality of bi-stable valves between the valve closed state and the valve open state, to allow for selective control of one or more adhesion zones on the bi-stable valve mechanism, the one or more adhesion zones corresponding to one or more adhesion areas on a surface of the one or more cut plies to be selectively picked up and removed from the work surface during the material handling process in the composite manufacturing.

Clause 16. The automated material handling system of Clause 15, wherein each of the plurality of bi-stable valves of the bi-stable valve mechanism comprises:
a non-ferrous sleeve having a first ferrous element and a second ferrous element;
a seal adjacent to the first ferrous element, the seal having an opening; and
a floating magnet within the non-ferrous sleeve and movable between,
(i) the first ferrous element, to block the opening and to cause the bi-stable valve to be in the valve closed state, and
(ii) the second ferrous element, to unblock the opening and to cause the bi-stable valve to be in the valve open state.

Clause 17. The automated material handling system of Clause 16, wherein each of the plurality of bi-stable valves further comprises:
a magnetic shielding around each of the plurality of bi-stable valves to limit magnetic interference of adjacent bi-stable valves.

Clause 18. The automated material handling system of any of Clauses 16 to 17, wherein the valve switch mechanism comprises:
at least one actuating control magnet assembly comprising:
(i) an actuator attached to the at least one traversable bridge apparatus; and
(ii) a control magnet coupled to the actuator and having a strength sufficient to overcome coupling of each floating magnet and its associated first ferrous plate,
wherein the actuator is configured to operably actuate the control magnet between an up position and a down position, and the control magnet is configured to impart a magnetic force on the floating magnet, to push the floating magnet down, to switch the bi-stable valve between the valve closed state and the valve open state.

Clause 19. The automated material handling system of Clause 18, wherein the valve switch mechanism further comprises:
one or more wiping magnets attached to the at least one traversable bridge apparatus and movable over the plurality of bi-stable valves, wherein the one or more wiping magnets are configured to reset one or more of the plurality of bi-stable valves to be in the valve closed state or the valve open state, prior to the control magnet moving over the plurality of bi-stable valves to selectively switch one or more of the plurality of bi-stable valves between the valve closed state and the valve open state.

Clause 20. The automated material handling system of Clause 15, wherein each of the plurality of bi-stable valves of the bi-stable valve mechanism comprises a plurality of vacuum ports with a plurality of vacuum port covers configured to open and close between the valve closed state and the valve open state.

Clause 21. The automated material handling system of Clause 20, wherein the valve switch mechanism comprises:
  at least one actuating compliant mechanism assembly comprising:
    (i) an actuator attached to the at least one traversable bridge apparatus;
    (ii) an actuating column structure coupled to the actuator;
    (iii) a plurality of hinged beams connected between the actuating column structure and one or more fixed column structures, each of the plurality of hinged beams having compliant rotational hinged portions;
    (iv) a sliding connecting rod element connected at a first end to the actuating column structure, and connected at a second end to one of the plurality of vacuum port covers, the sliding connecting rod element having compliant rotational hinged portions; and
    (v) a pair of guides coupled to a base of the at least one actuating compliant mechanism assembly, the pair of guides configured to guide the vacuum port cover,
  wherein the actuator is configured to operably actuate the actuating column structure in a down position, which, in turn, slides the sliding connecting rod element, to push the vacuum port cover over the vacuum port, and to switch the bi-stable valve from the valve open state to the valve closed state.

Clause 22. A method of using an automated bi-stable valve system in a material handling process for composite manufacturing, the method comprising the steps of:
  providing an automated bi-stable valve system comprising:
    (a) a bi-stable valve mechanism comprising a plurality of bi-stable valves, wherein each of the plurality of bi-stable valves is configured to switch between a valve closed state and a valve open state; and
    (b) a control system coupled to the bi-stable valve mechanism and configured to operably control the bi-stable valve mechanism, the control system comprising:
      (i) at least one traversable bridge apparatus; and
      (ii) a valve switch mechanism attached to the at least one traversable bridge apparatus, and movable, via the at least one traversable bridge apparatus, over the plurality of bi-stable valves;
  coupling the automated bi-stable valve system to an end effector attached to a robot and attached to a vacuum system; and
  selectively picking up and removing, with the automated bi-stable valve system, one or more cut plies from a work surface, by selectively switching, with the valve switch mechanism, one or more of the plurality of bi-stable valves from the valve closed state to the valve open state, to allow for selective control of one or more adhesion zones on the bi-stable valve mechanism, the one or more adhesion zones corresponding to one or more adhesion areas on a surface of the one or more cut plies, and to increase valve densities.

Clause 23. The method of Clause 22, wherein providing the automated bi-stable valve system further comprises:
  providing the automated bi-stable valve system, wherein each of the plurality of bi-stable valves of the bi-stable valve mechanism further comprises:
    a non-ferrous sleeve having a first ferrous element and a second ferrous element;
    a seal adjacent to the first ferrous element, the seal having an opening;
    a floating magnet within the non-ferrous sleeve and movable between,
      (i) the first ferrous element, to block the opening and to cause the bi-stable valve to be in the valve closed state, and
      (ii) the second ferrous element, to unblock the opening and to cause the bi-stable valve be in the valve open state; and
    a magnetic shielding around each of the plurality of bi-stable valves to limit magnetic interference of adjacent bi-stable valves.

Clause 24. The method of any of Clauses 22 to 23, wherein providing the automated bi-stable valve system further comprises:
  providing the automated bi-stable valve system, wherein the valve switch mechanism comprises:
    at least one actuating control magnet assembly comprising:
      (i) an actuator attached to the at least one traversable bridge apparatus;
      (ii) a control magnet coupled to the actuator and having a strength sufficient to overcome coupling of each floating magnet and its associated first ferrous element,
    wherein the actuator is configured to operably actuate the control magnet between an up position and a down position, and the control magnet is configured to impart a magnetic force on the floating magnet, to push the floating magnet down, to switch the bi-stable valve between the valve closed state and the valve open state.

Clause 25. The method of any of Clauses 22 to 24, wherein providing the automated bi-stable valve system further comprises:
  providing the automated bi-stable valve system, wherein the valve switch mechanism further comprises:
  one or more wiping magnets attached to the at least one traversable bridge apparatus and movable over the plurality of bi-stable valves, wherein the one or more wiping magnets are configured to reset one or more of the plurality of bi-stable valves to be in the valve closed state or the valve open state, prior to the control magnet moving over the plurality of bi-stable valves to selectively switch one or more of the plurality of bi-stable valves between the valve closed state and the valve open state.

Clause 26. The method of Clause 22, wherein providing the automated bi-stable valve system further comprises:
  providing the automated bi-stable valve system, wherein each of the plurality of bi-stable valves of the bi-stable valve mechanism comprises a plurality of vacuum ports with a plurality of vacuum port covers configured to open and close between the valve closed state and the valve open state.

Clause 27. The method of any of Clauses 22 and 26, wherein providing the automated bi-stable valve system further comprises:
provinding the automated bi-stable valve system, wherein the valve switch mechanism comprises:
at least one actuating compliant mechanism assembly comprising:
(i) an actuator attached to the at least one traversable bridge apparatus;
(ii) an actuating column structure coupled to the actuator;
(iii) a plurality of hinged beams connected between the actuating column structure and one or more fixed column structures, each of the plurality of hinged beams having compliant rotational hinged portions;
(iv) a sliding connecting rod element connected at a first end to the actuating column structure, and connected at a second end to one of the plurality of vacuum port covers, the sliding connecting rod element having compliant rotational hinged portions; and
(v) a pair of guides coupled to a base of the at least one actuating compliant mechanism assembly, the pair of guides configured to guide the vacuum port cover,
wherein the actuator is configured to operably actuate the actuating column structure in a down position, which, in turn, slides the sliding connecting rod element, to push the vacuum port cover over the vacuum port, and to switch the bi-stable valve from the valve open state to the valve closed state.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. An automated bi-stable valve system comprising:
a bi-stable valve mechanism comprising a plurality of bi-stable valves, wherein each of the plurality of bi-stable valves is configured to switch between a valve closed state and a valve open state; and
a control system coupled to the bi-stable valve mechanism and configured to operably control the bi-stable valve mechanism, the control system comprising:
(i) at least one traversable bridge apparatus; and
(ii) a valve switch mechanism attached to the at least one traversable bridge apparatus, and movable, via the at least one traversable bridge apparatus, over the plurality of bi-stable valves, the valve switch mechanism comprising a plurality of control actuators, wherein the plurality of bi-stable valves comprises a plurality of rows of bi-stable valves, and wherein each control actuator of the plurality of control actuators is configured to actuate one or more different rows of the plurality of rows of the plurality of bi-stable valves, and each of the plurality of control actuators correspond to the respective plurality of rows,
wherein the valve switch mechanism is configured to switch one or more of the plurality of bi-stable valves between the valve closed state and the valve open state, to allow for selective control of one or more adhesion zones on the bi-stable valve mechanism, the one or more adhesion zones corresponding to one or more adhesion areas on a surface of a material to be selectively picked up and placed during a material handling process.

2. The automated bi-stable valve system of claim 1, wherein the automated bi-stable valve system is configured for attachment to an end effector attached to a robot.

3. The automated bi-stable valve system of claim 1, wherein the automated bi-stable valve system is a 1-to-many multiplexing valve system.

4. The automated bi-stable valve system of claim 1, wherein the plurality of control actuators comprise electric solenoids housed within the at least one traversable bridge apparatus.

5. The automated bi-stable valve system of claim 1, wherein each of the plurality of bi-stable valves of the bi-stable valve mechanism comprises:
a non-ferrous sleeve having a first ferrous element and a second ferrous element;
a seal adjacent to the first ferrous element, the seal having an opening; and
a floating magnet within the non-ferrous sleeve and movable between,
(i) the first ferrous element, to block the opening and to cause the bi-stable valve to be in the valve closed state; and
(ii) the second ferrous element, to unblock the opening and to cause the bi-stable valve to be in the valve open state.

6. The automated bi-stable valve system of claim 5, wherein each of the plurality of bi-stable valves further comprises:
a ferrous shielding around each of the plurality of bi-stable valves to limit magnetic interference of adjacent bi-stable valves.

7. The automated bi-stable valve system of claim 5, wherein the valve switch mechanism comprises:
at least one actuating control magnet assembly comprising:
(i) an actuator attached to the at least one traversable bridge apparatus; and
(ii) a control magnet coupled to the actuator and having a strength sufficient to overcome coupling of each floating magnet and its associated first ferrous element,
wherein the actuator is configured to operably actuate the control magnet between an up position and a down position, and the control magnet is configured to impart a magnetic force on the floating magnet, to push the floating magnet down, to switch the bi-stable valve between the valve closed state and the valve open state.

8. The automated bi-stable valve system of claim 7, wherein the actuator comprises one of, an electric solenoid, a pneumatic solenoid, or an electric motor.

9. The automated bi-stable valve system of claim 7, wherein the valve switch mechanism further comprises:
one or more wiping magnets attached to the at least one traversable bridge apparatus and movable over the plurality of bi-stable valves, wherein the one or more wiping magnets are configured to reset one or more of the plurality of bi-stable valves to be in the valve closed state or the valve open state, prior to the control magnet moving over the plurality of bi-stable valves to selectively switch one or more of the plurality of bi-stable valves between the valve closed state and the valve open state.

10. The automated bi-stable valve system of claim 7, wherein the valve switch mechanism further comprises:
one of, an electromagnet, a solenoid-mounted control magnet with a polarity that is opposite the control magnet, a mechanism to move a magnetic pole, or a mechanism to block or decrease a magnetic strength.

11. The automated bi-stable valve system of claim 1, wherein each of the plurality of bi-stable valves of the bi-stable valve mechanism comprises a plurality of vacuum ports with a plurality of vacuum port covers configured to open and close between the valve closed state and the valve open state.

12. The automated bi-stable valve system of claim 1, wherein the valve switch mechanism comprises:
at least one actuating compliant mechanism assembly comprising:
  (i) an actuator attached to the at least one traversable bridge apparatus;
  (ii) an actuating column structure coupled to the actuator;
  (iii) a plurality of hinged beams connected between the actuating column structure and one or more fixed column structures, each of the plurality of hinged beams having compliant rotational hinged portions;
  (iv) a sliding connecting rod element connected at a first end to the actuating column structure, and connected at a second end to one of a plurality of vacuum port covers, the sliding connecting rod element having compliant rotational hinged portions; and
  (v) a pair of guides coupled to a base of the at least one actuating compliant mechanism assembly, the pair of guides configured to guide the one vacuum port cover,
wherein the actuator is configured to operably actuate the actuating column structure in a down position, which, in turn, slides the sliding connecting rod element, to push the one vacuum port cover over a vacuum port, and to switch the bi-stable valve from the valve open state to the valve closed state.

13. The automated bi-stable valve system of claim 12, wherein the actuator comprises one of, a linear actuator, or a rotary actuator.

14. The automated bi-stable valve system of claim 1, wherein the material to be picked up and placed during the material handling process comprises one or more plies comprised of unidirectional fiber material.

15. An automated material handling system for a material handling process in composite manufacturing, the automated material handling system comprising:
one or more cut plies to be selectively picked up and removed from a work surface;
a robot having an arm with an end effector;
a vacuum system coupled to the end effector; and
an automated bi-stable valve system coupled to a first end of the end effector, the automated bi-stable valve system comprising:
  (a) a bi-stable valve mechanism comprising a plurality of bi-stable valves, wherein each of the plurality of bi-stable valves is configured to switch between a valve closed state and a valve open state; and
  (b) a control system coupled to the bi-stable valve mechanism and configured to operably control the bi-stable valve mechanism, the control system comprising:
    (i) at least one traversable bridge apparatus; and
    (ii) a valve switch mechanism attached to the at least one traversable bridge apparatus, and movable, via the at least one traversable bridge apparatus, over the plurality of bi-stable valves, the valve switch mechanism comprising a plurality of control actuators, wherein the plurality of bi-stable valves comprises a plurality of rows of bi-stable valves, and wherein each control actuator of the plurality of control actuators is configured to actuate one or more different rows of the plurality of rows of the plurality of bi-stable valves, and each of the plurality of control actuators correspond to the respective plurality of rows,
wherein the valve switch mechanism is configured to switch one or more of the plurality of bi-stable valves between the valve closed state and the valve open state, to allow for selective control of one or more adhesion zones on the bi-stable valve mechanism, the one or more adhesion zones corresponding to one or more adhesion areas on a surface of the one or more cut plies to be selectively picked up and removed from the work surface during the material handling process in the composite manufacturing.

16. The automated material handling system of claim 15, wherein each of the plurality of bi-stable valves of the bi-stable valve mechanism comprises:
a non-ferrous sleeve having a first ferrous element and a second ferrous element;
a seal adjacent to the first ferrous element, the seal having an opening; and
a floating magnet within the non-ferrous sleeve and movable between,
  (i) the first ferrous element, to block the opening and to cause the bi-stable valve to be in the valve closed state; and
  (ii) the second ferrous element, to unblock the opening and to cause the bi-stable valve to be in the valve open state.

17. The automated material handling system of claim 16, wherein each of the plurality of bi-stable valves further comprises:
a ferrous shielding around each of the plurality of bi-stable valves to limit magnetic interference of adjacent bi-stable valves.

18. The automated material handling system of claim 16, wherein the valve switch mechanism comprises:
at least one actuating control magnet assembly comprising:
  (i) an actuator attached to the at least one traversable bridge apparatus; and
  (ii) a control magnet coupled to the actuator and having a strength sufficient to overcome coupling of each floating magnet and its associated first ferrous element,
wherein the actuator is configured to operably actuate the control magnet between an up position and a down position, and the control magnet is configured to impart a magnetic force on the floating magnet, to push the floating magnet down, to switch the bi-stable valve between the valve closed state and the valve open state.

19. The automated material handling system of claim 18, wherein the valve switch mechanism further comprises:
one or more wiping magnets attached to the at least one traversable bridge apparatus and movable over the plurality of bi-stable valves, wherein the one or more wiping magnets are configured to reset one or more of the plurality of bi-stable valves to be in the valve closed state or the valve open state, prior to the control magnet moving over the plurality of bi-stable valves to selectively switch one or more of the plurality of bi-stable valves between the valve closed state and the valve open state.

20. The automated material handling system of claim 15, wherein each of the plurality of bi-stable valves of the bi-stable valve mechanism comprises a plurality of vacuum ports with a plurality of vacuum port covers configured to open and close between the valve closed state and the valve open state.

21. The automated material handling system of claim 15, wherein the valve switch mechanism comprises:
at least one actuating compliant mechanism assembly comprising:
(i) an actuator attached to the at least one traversable bridge apparatus;
(ii) an actuating column structure coupled to the actuator;
(iii) a plurality of hinged beams connected between the actuating column structure and one or more fixed column structures, each of the plurality of hinged beams having compliant rotational hinged portions;
(iv) a sliding connecting rod element connected at a first end to the actuating column structure, and connected at a second end to one of a plurality of vacuum port covers, the sliding connecting rod element having compliant rotational hinged portions; and
(v) a pair of guides coupled to a base of the at least one actuating compliant mechanism assembly, the pair of guides configured to guide the one vacuum port cover,
wherein the actuator is configured to operably actuate the actuating column structure in a down position, which, in turn, slides the sliding connecting rod element, to push the one vacuum port cover over a vacuum port, and to switch the bi-stable valve from the valve open state to the valve closed state.

22. A method of using an automated bi-stable valve system in a material handling process for composite manufacturing, the method comprising the steps of:
providing the automated bi-stable valve system comprising:
(a) a bi-stable valve mechanism comprising a plurality of bi-stable valves, wherein each of the plurality of bi-stable valves is configured to switch between a valve closed state and a valve open state; and
(b) a control system coupled to the bi-stable valve mechanism and configured to operably control the bi-stable valve mechanism, the control system comprising:
(i) at least one traversable bridge apparatus; and
(ii) a valve switch mechanism attached to the at least one traversable bridge apparatus, and movable, via the at least one traversable bridge apparatus, over the plurality of bi-stable valves, the valve switch mechanism comprising a plurality of control actuators, wherein the plurality of bi-stable valves comprises a plurality of rows of bi-stable valves, and wherein each control actuator of the plurality of control actuators is configured to actuate one or more different rows of the plurality of rows of the plurality of bi-stable valves, and each of the plurality of control actuators correspond to the respective plurality of rows;
coupling the automated bi-stable valve system to an end effector attached to a robot and attached to a vacuum system; and
selectively picking up and removing, with the automated bi-stable valve system, one or more cut plies from a work surface, by selectively switching, with the valve switch mechanism, one or more of the plurality of bi-stable valves from the valve closed state to the valve open state, to allow for selective control of one or more adhesion zones on the bi-stable valve mechanism, the one or more adhesion zones corresponding to one or more adhesion areas on a surface of the one or more cut plies, and to increase valve densities.

23. The method of claim 22, wherein providing the automated bi-stable valve system further comprises:
providing the automated bi-stable valve system, wherein each of the plurality of bi-stable valves of the bi-stable valve mechanism further comprises:
a non-ferrous sleeve having a first ferrous element and a second ferrous element;
a seal adjacent to the first ferrous element, the seal having an opening;
a floating magnet within the non-ferrous sleeve and movable between,
(i) the first ferrous element, to block the opening and to cause the bi-stable valve to be in the valve closed state; and
(ii) the second ferrous element, to unblock the opening and to cause the bi-stable valve to be in the valve open state; and
a ferrous shielding around each of the plurality of bi-stable valves to limit magnetic interference of adjacent bi-stable valves.

24. The method of claim 23, wherein providing the automated bi-stable valve system further comprises:
providing the automated bi-stable valve system, wherein the valve switch mechanism comprises:
at least one actuating control magnet assembly comprising:
(i) an actuator attached to the at least one traversable bridge apparatus; and
(ii) a control magnet coupled to the actuator and having a strength sufficient to overcome coupling of each floating magnet and its associated first ferrous element,
wherein the actuator is configured to operably actuate the control magnet between an up position and a down position, and the control magnet is configured to impart a magnetic force on the floating magnet, to push the floating magnet down, to switch the bi-stable valve between the valve closed state and the valve open state.

25. The method of claim 24, wherein providing the automated bi-stable valve system further comprises:
providing the automated bi-stable valve system, wherein the valve switch mechanism further comprises:
one or more wiping magnets attached to the at least one traversable bridge apparatus and movable over the plurality of bi-stable valves, wherein the one or more wiping magnets are configured to reset one or more of the plurality of bi-stable valves to be in the valve closed state or the valve open state, prior to the control magnet moving over the plurality of bi-stable valves to selectively switch one or more of the plurality of bi-stable valves between the valve closed state and the valve open state.

26. The method of claim 22, wherein providing the automated bi-stable valve system further comprises:
providing the automated bi-stable valve system, wherein each of the plurality of bi-stable valves of the bi-stable valve mechanism comprises a plurality of vacuum ports with a plurality of vacuum port covers configured to open and close between the valve closed state and the valve open state.

27. The method of claim 22, wherein providing the automated bi-stable valve system further comprises:
providing the automated bi-stable valve system, wherein the valve switch mechanism comprises:
at least one actuating compliant mechanism assembly comprising:
(i) an actuator attached to the at least one traversable bridge apparatus;
(ii) an actuating column structure coupled to the actuator;
(iii) a plurality of hinged beams connected between the actuating column structure and one or more fixed column structures, each of the plurality of hinged beams having compliant rotational hinged portions;
(iv) a sliding connecting rod element connected at a first end to the actuating column structure, and connected at a second end to one of a plurality of vacuum port covers, the sliding connecting rod element having compliant rotational hinged portions; and
(v) a pair of guides coupled to a base of the at least one actuating compliant mechanism assembly, the pair of guides configured to guide the one vacuum port cover,
wherein the actuator is configured to operably actuate the actuating column structure in a down position, which, in turn, slides the sliding connecting rod element, to push the one vacuum port cover over a vacuum port, and to switch the bi-stable valve from the valve open state to the valve closed state.

* * * * *